(12) United States Patent
Salesin et al.

(10) Patent No.: US 6,198,489 B1
(45) Date of Patent: Mar. 6, 2001

(54) COMPUTER GENERATED WATERCOLOR

(75) Inventors: David H. Salesin; Cassidy Curtis, both of Seattle, WA (US); Sean Anderson, Mountain View, CA (US); Joshua E. Seims, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/025,412

(22) Filed: Feb. 18, 1998

Related U.S. Application Data

(60) Provisional application No. 60/039,020, filed on Feb. 21, 1997.

(51) Int. Cl.$^7$ ................................................. G06T 11/40
(52) U.S. Cl. ............................................................. 345/431
(58) Field of Search ..................................... 345/429–432

(56) References Cited

U.S. PATENT DOCUMENTS

| | | | |
|---|---|---|---|
| 5,384,899 | * 1/1995 | Amit ..................................... | 345/429 |
| 5,432,896 | * 7/1995 | Hwong et al. ....................... | 345/429 |
| 5,784,301 | * 7/1998 | Guo et al. ......................... | 395/500.27 |
| 5,828,819 | * 10/1998 | Do et al. .............................. | 345/431 |

OTHER PUBLICATIONS

Chet S. Haase and Gary W. Meyer, "Modeling Pigmented Materials for Realistic Image Synthesis", ACM Transactions on Graphics, vol. 11, No. 4, Oct. 1992, pp. 305–335, 1992.*
"Modeling and Rendering of Metallic Patinas" Julie Dorsey and Pat Hanrahan, Computer Graphics Proceedings, 1996.*
Chen, Jim X., et al., "Towards Interactive–Rate Simulation of Fluids with Moving Obstacles Using Navier–Stokes Equations," Graphical Models and Image Processing, vol. 57, No. 2, Mar., 1995, pp. 107–116.

Cockshott, Tunde, et al., "Modelling the Texture of Paint," Eurographics '92, A. Kilgour and L. Kjelldahl (Guest Editors), Blackwell Publishers, vol. 11 (1992), No. 3, © Eurographics Association, 1992, pp. C–217–C–226.

Dorsey, Julie, et al., "Modeling and Rendering Of Metallic Patinas," Computer Graphics Proceedings, Annual Conference Series, 1996, pp. 387–396.

Dorsey, Julie, et al., "Flow and Changes in Appearance," Computer Graphics Proceedings, Annual Conference Series, 1996, pp. 411–420.

Foster, Nick, et al., "Realistic Animation of Liquids," Graphics Interface '96, pp. 204–212.

Guo, Qinglian, "Generating Realistic Calligraphy Words," IEICE Trans. Fundamentals, vol. E78–A, No. 11, Nov. 1995, pp. 1556–1558.

Guo, Qinglian, et al., "Modeling the Diffuse Paintings of 'Sumie'," pp. 329–338.

Kass, Michael, et al., "Rapid, Stable Fluid Dynamics for Computer Graphics," Computer Graphics, vol. 24, No. 4, Aug. 1990, pp. 49–55.

(List continued on next page.)

*Primary Examiner*—Mark R. Powell
*Assistant Examiner*—Thu Nguyen

(57) ABSTRACT

A watercolor model based on an ordered set of translucent glazes, which are created independently usinig a shallow water fluid simulation. A Kubelka-Munk compositing model is used for simulating the optical effect of the superimposed glazes. The computer generated watercolor model is used as part of an interactive watercolor paint system, or as a method for automatic image "watercolorization."

24 Claims, 14 Drawing Sheets

(3 of 14 Drawing Sheet(s) Filed in Color)

OTHER PUBLICATIONS

Musgrave, F. Kenton., et al., "The Synthesis and Rendering of Eroded Fractal Terrains," Computer Graphics, vol. 23, No. 3, Jul. 1989, pp. 41–50.

Pham, Binh, "Expressive Brush Strokes," CVGIP: Graphical Models And Image Processing, vol. 53, No. 1, Jan., pp. 1–6, 1991.

Small, David, "Simulating Watercolor by Modeling Diffusion, Pigment, and Paper Fibers," SPIE vol. 1460, Image Handling and Reproduction Systems Integration (1991), pp. 140–146.

Strassmann, Steve, "Hairy Brushes," SIGGRAPH '86, Dallas, Aug. 18–22, vol. 20, No. 4, 1986, pp. 225–232.

* cited by examiner

| SYMBOL | DEFINITION | IN PROCEDURE |
|---|---|---|
| $k$ | VISCOUS DRAG DUE TO BOUNDARY LAYER | MoveFluid |
| $\mu$ | VISCOSITY OF FLUID | MoveFluid |
| relax | SPEED OF RELAXATION PROCESS | ReduceDivergence |
| maxdiv | REDCE DIVERGENCE TO THIS THRESHOLD | ReduceDivergence |
| maxsteps | MAX RELAXATION STEPS TO ATTEMPT | ReduceDivergence |
| npigs | NUMBER OF PIGMENTS | MovePigment |
| deposit[p] | RATE OF PIGMENT ABSORPTION | AdsorbPigment |
| lift[p] | RATE OF PIGMENT DESORPTION | AdsorbPigment |
| exposure[p] | EFFECT OF PAPER HEIGHT ON ADSORPTION | AdsorbPigment |
| edgeKer | BLUR KERNEL FOR EDGE | DarkenEdges |
| darkening | MULTIPLIER FOR EDGE DARKENING | DarkenEdges |
| $\delta$ | VALUE BELOW WHICH A PIXEL WILL NOT RECEIVE DIFFUSION IN BOTTOM LAYER | DiffuseWater |
| absorption | AMOUNT OF WATER ABSORBED INTO BOTTOM LAYER PER TIME STEP | DiffuseWater |
| $\sigma$ | THRESHOLD FOR WETTING FROM BOTTOM LAYER | DiffuseWater |
| $\varepsilon$ | MIN SATURATION A PIXEL MUST HAVE BEFORE IT CAN DIFFUSE TO ITS NEIGHBORS | DiffuseWater |

*FIG. 3*

| PLATE | PIGMENT | $K_r$ | $K_g$ | $K_b$ | $S_r$ | $S_g$ | $S_b$ |
|---|---|---|---|---|---|---|---|
| 5A | COBALT BLUE | 0.41 | 0.28 | 0.03 | 0.01 | 0.06 | 0.19 |
| 5B | FRENCH ULTRAMARINE | 0.90 | 0.92 | 0.13 | 0.005 | 0.005 | 0.05 |
| 5C | INDIGO | 0.88 | 0.96 | 0.38 | 0.01 | 0.01 | 0.03 |
| 5D | SAP GREEN | 0.64 | 0.32 | 0.97 | 0.01 | 0.04 | 0.01 |
| 5E | PHTHALO GREEN | 0.99 | 0.30 | 0.43 | 0.01 | 0.04 | 0.03 |
| 5F | CERULEAN BLUE | 0.73 | 0.16 | 0.10 | 0.01 | 0.04 | 0.14 |
| 5G | CADMIUM YELLOW | 0.01 | 0.13 | 0.99 | 0.84 | 0.55 | 0.01 |
| 5H | HANSA YELLOW | 0.01 | 0.05 | 0.97 | 0.34 | 0.54 | 0.02 |
| 5I | COBALT YELLOW | 0.05 | 0.09 | 0.99 | 0.48 | 0.54 | 0.01 |
| 5J | QUINACRIDONE ROSE | 0.07 | 0.80 | 0.28 | 0.05 | 0.005 | 0.04 |
| 5K | CADMIUM RED | 0.01 | 0.61 | 0.75 | 0.64 | 0.05 | 0.01 |
| 5L | INDIAN RED | 0.19 | 0.56 | 0.70 | 0.32 | 0.09 | 0.01 |

*FIG. 5*

| PARAMETER | PLATE 3A | PLATE 3B | PLATE 3C | PLATE 3D | PLATE 3D | PLATE 3E | PLATE 3F | PLATE 1 | PLATE 1 |
|---|---|---|---|---|---|---|---|---|---|
| $k_d$ | 0.05 | 0.05 | 0.05 | 0.05 | 0.02 | 0.05 | 0.05 | 0.05 | 0.05 |
| $\mu$ | 0.1 | 0.1 | 0.1 | 0.1 | 0.1 | 0.1 | 0.1 | 0.1 | 0.1 |
| relax | 0.1 | 0.1 | 0.1 | 0.1 | 0.1 | 0.1 | 0.1 | 0.1 | 0.1 |
| maxdiv | 0.01 | 0.01 | 0.01 | 0.01 | 0.03 | 0.01 | 0.01 | 0.01 | 0.01 |
| maxsteps | 50.0 | 50.0 | 50.0 | 50.0 | 50.0 | 50.0 | 50.0 | 50.0 | 50.0 |
| edgeKer | 30.0 | 30.0 | 30.0 | 30.0 | 30.0 | 30.0 | 30.0 | 30.0 | 30.0 |
| darkening | 0.01 | 0.01 | 0.01 | 0.01 | 0.01 | 0.01 | 0.01 | 0.01 | 0.01 |
| npigs | 2.0 | 2.0 | 2.0 | 2.0 | 2.0 | 2.0 | 2.0 | 2.0 | 2.0 |
| deposit[0] | 0.05 | 0.05 | 0.05 | 0.05 | 0.01 | 0.05 | 0.1 | 0.05 | 0.05 |
| lift[0] | 0.1 | 0.1 | 0.05 | 0.1 | 0.005 | 0.5 | 0.1 | 0.1 | 0.05 |
| exposure[0] | 0.2 | 0.2 | 0.2 | 0.2 | 0.2 | 0.2 | 0.2 | | |
| deposit[1] | 0.05 | 0.05 | 0.05 | 0.05 | 0.02 | 0.05 | 0.001 | | |
| lift[1] | 0.05 | 0.05 | 0.025 | 0.05 | 0.005 | 0.025 | 0.001 | | |
| exposure[1] | 0.6 | 0.6 | 0.6 | 0.6 | 0.6 | 0.6 | 0.2 | | |
| absorption | | | | | 0.5 | | | | |
| $\varepsilon$ | | | | | 0.62 | | | 0.4 | 0.6 |
| thresh | | | | | 0.001 | | | | |
| $\delta$ | | | | | 0.65 | | | | |

*FIG. 4*

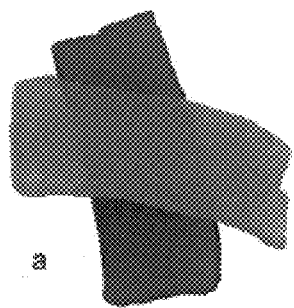
a
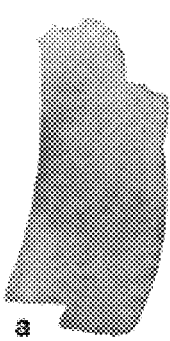
a
b
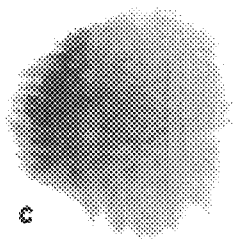
c
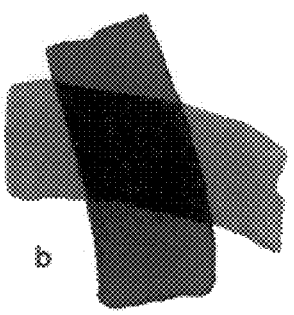
b
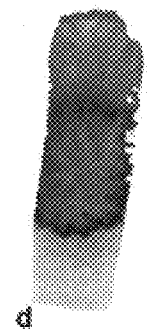
d
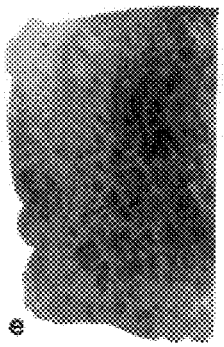
e
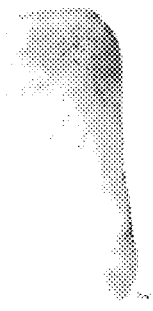
f
Plate 1
Plate 2
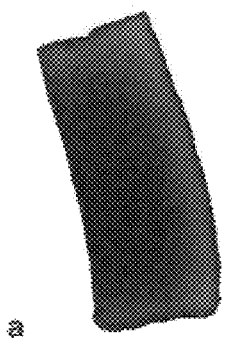
a
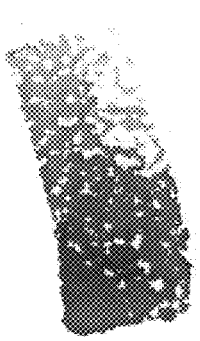
b
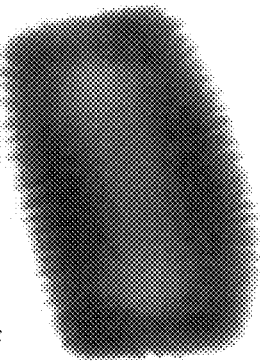
c
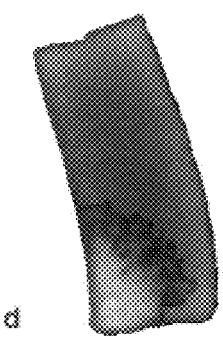
d
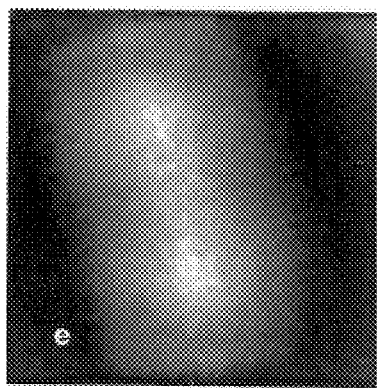
e
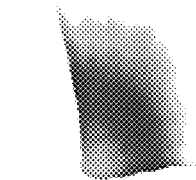
f
Plate 3

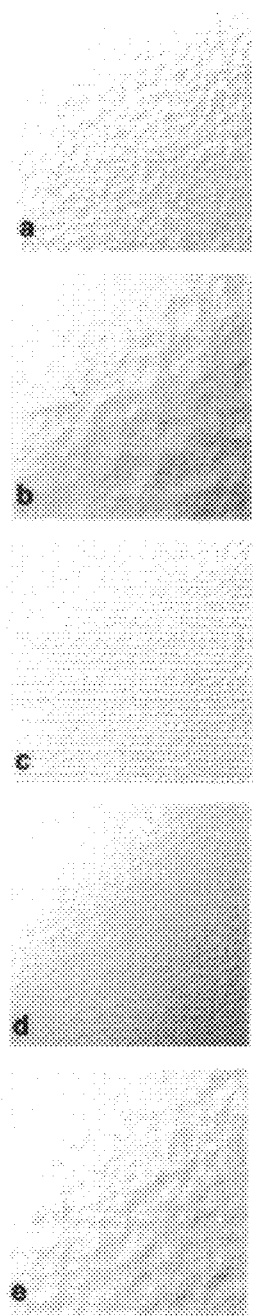
Plate 6
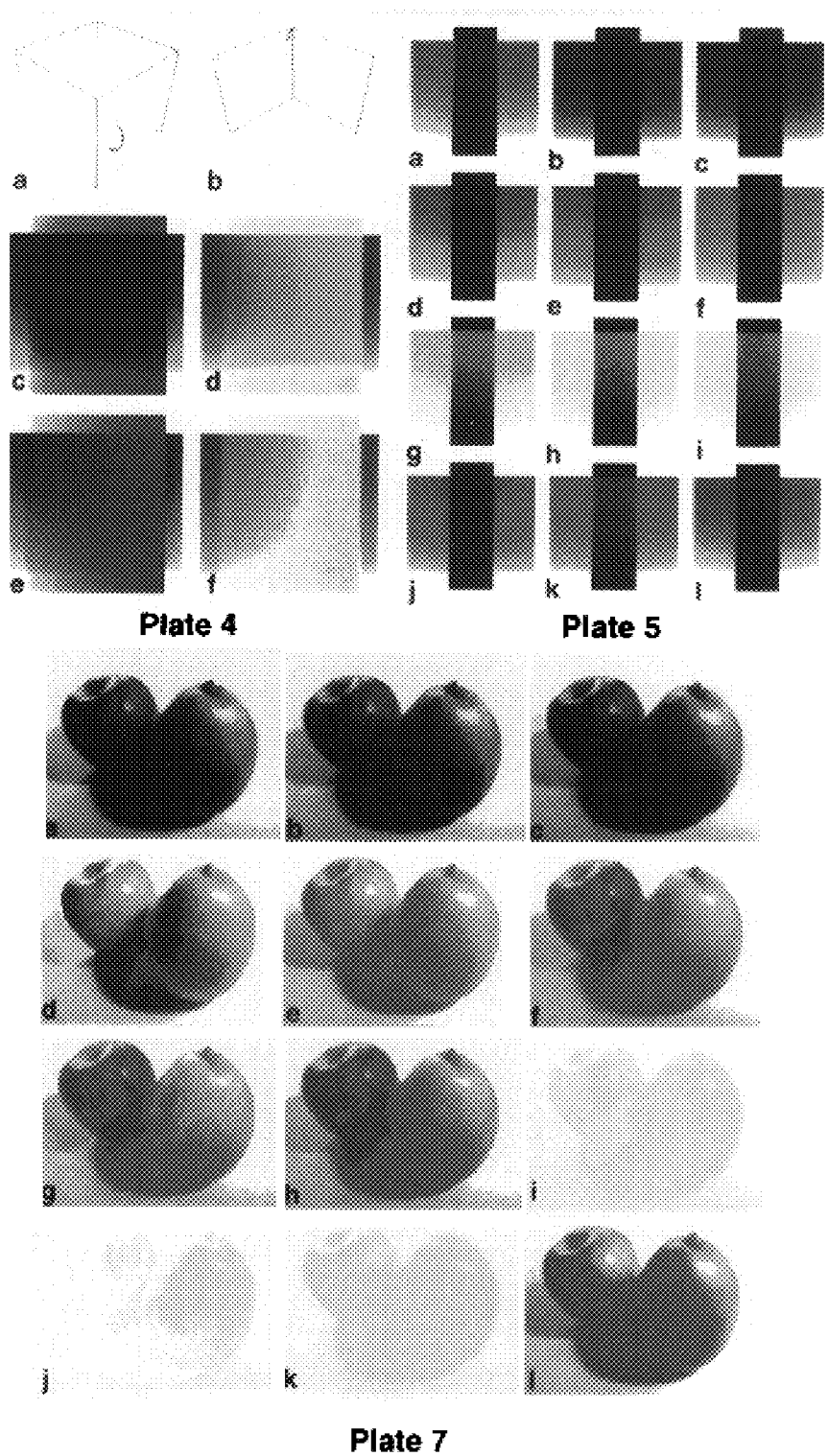
Plate 4
Plate 5
Plate 7

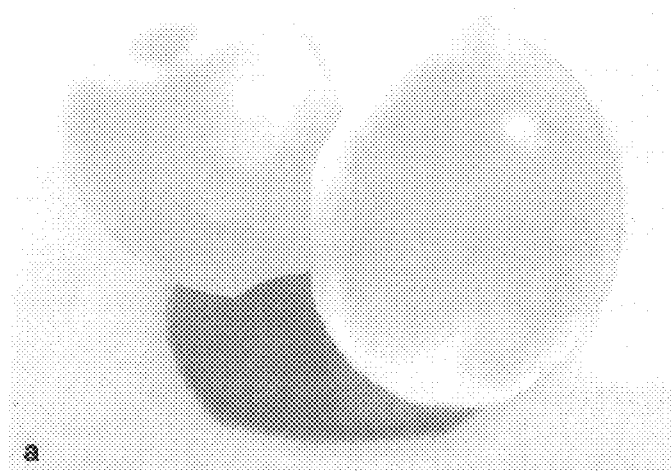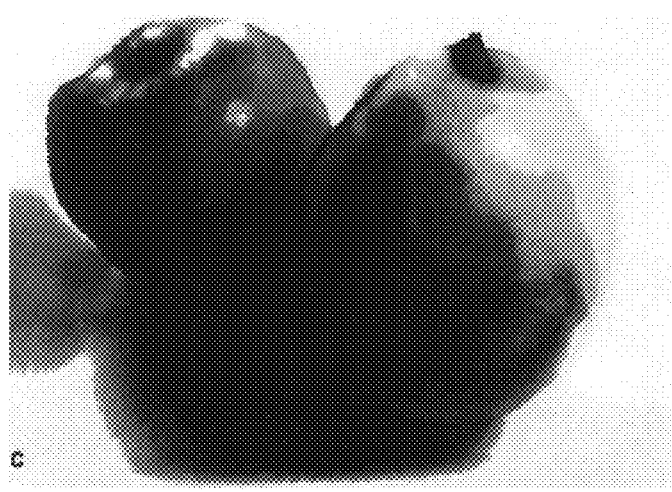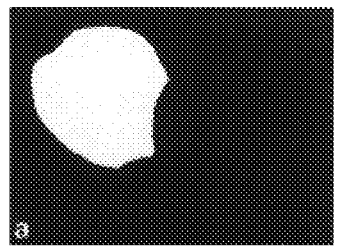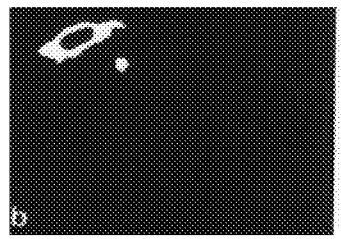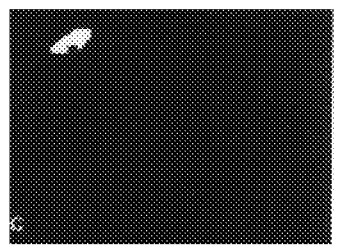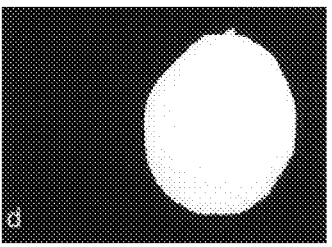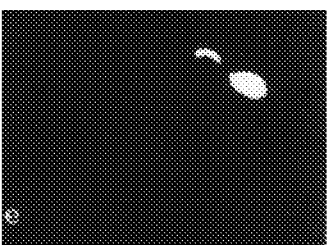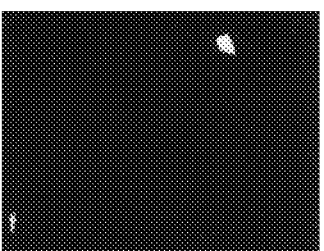
Plate 8
Plate 9

COMPUTER GENERATED WATERCOLOR

RELATED APPLICATION

This application is a continuation-in-part of prior copending provisional Application Ser. No. 60/039,020, filed Feb. 21, 1997, priority in the filing date of which is hereby claimed under 35 United States Code Section 119(e).

FIELD OF THE INVENTION

The present invention generally relates to the use of a computer to produce an image that appears to be produced by hand, and more specifically, to the use of a computer to generate a watercolor image or to modify an existing image that is not a watercolor so that it appears to be a watercolor.

BACKGROUND OF THE INVENTION

Watercolor is unlike any other artistic medium. It has a translucent, luminous quality. It can be applied in delicate layers to achieve subtle variations in color, and it can be used to create a wide variety of beautiful textures and patterns.

Since it is possible to characterize the most important effects of watercolor, it is clearly desirable to simulate these characteristics automatically, with a computer. It is apparent that computer generated watercolor can be used as part of an interactive watercolor paint system, or alternatively, as a method for automatic image "watercolorization."

A watercolor simulator should be largely empirically-based; it may incorporate some physically-based models, but need not be a strict physical simulation. Instead, the simulator should enable the user to re-create, synthetically, the salient features of watercolor in a way that is both predictable and controllable. Absolute physical realism is only a secondary goal.

There exists a long line of important work on simulating artists' traditional media and tools. However, the prior art does not address certain areas. Relative to the prior art on this topic, a more sophisticated paper model, a more complex shallow water simulation, and a more realistic rendering and optical compositing of pigmented layers is needed. Further, a novel approach is required that will provide many additional watercolor effects such as edge darkening, hard edges, backruns, and separation of pigments. These effects are necessary to produce a look that is much closer to real watercolors, and to capture more of the feeling of transparency and luminosity that is characteristic of the medium. An optical compositing method is particularly important for getting the appropriate look for transparency of multiple layers.

In the commercial realm, certain watercolor effects are provided by prior art products such as Fractal Design Painter and by a plug-in for Adobe Photoshop. Yet, these products do not appear to give as realistic watercolor results as would be desired. Others working on this topic have explored the effects of sumie painting, and that work has been applied to calligraphy. A related prior art model of ink diffusion through paper resembles, to some extent, the water simulation techniques useful in producing the characteristic pigment flow of watercolor.

Other research work on modeling thick, shiny paint and the effects of bristle brushes on painting and calligraphy is also relevant to this problem, by providing a plausible simulation of traditional artists' tools. It may be desirable to include a brushstroke model in the simulation process to enable the creation of the bristle patterns in a dry brush effect. The brushstroke model would thus serve as a complement to paper texture effects in the dry brush model.

SUMMARY OF THE INVENTION

In accord with the present invention, a method is defined for producing a watercolor simulationi that represents at least one wash applied to paper, each wash including at least one pigment dispersed in a fluid. The method includes the step of providing a fluid model that includes a plurality of layers for each wash included in the watercolor simulation. As a function of a plurality of predefined parameters and in accord with the fluid model, the manner in which each wash flows over the paper is specified to determine quantities of each pigment deposited at a plurality of discrete spatial locations on the paper. An optical composite model is applied to render the watercolor simulation as a function of optical characteristics of each pigment and as a function of the quantities of each pigment deposited at the plurality of discrete spatial locations on the paper.

The plurality of parameter-s preferably include physical properties of each pigment employed in producing the watercolor simulation, physical properties of the paper used for the watercolor simulation, and/or predetermined values used in defining the fluid model. Furthernore, the quantities of each pigment deposited at the plurality of discrete spatial locations are preferably stored in an array. A data structure that includes the arrays for the pigments used in a wash comprises a glaze.

A Kubelka-Munk model is preferably employed as the optical composite model for rendering the watercolor simulation. The plurality of layers in the fluid model include a shallow fluid layer (or in a preferred embodiment, a shallow water layer) in which the wash flows above a surface of the paper; a pigment deposition layer where a pigment is adsorbed and desorbed by the paper; and a capillary layer within the paper in which the wash is diffused by a capillary action. The step of specifying how each wash flows over the paper includes the step of determining a movement of the wash in the shallow fluid layer, as a function of a velocity of the wash as it moves over the paper. In addition, this feature of the invention preferably includes the step of reducing a divergence of a velocity field for each wash by redistributing the wash, so that the divergence in a specific time interval is less than a predetermined value.

In specifying how each wash flows over the paper, the method provides for reducing the quantity of pigment at the discrete spatial locations as a function of the velocity of the wash away from the discrete spatial locations. A rate of absorption and desorption for the pigment in each wash is determined as a function of the predefined parameters and is used to determine the quantities of each pigment deposited at the discrete spatial locations.

An edge darkening effect is determined as a function of the predefined parameters, by increasing the quantities of each pigment at discrete spatial locations corresponding to edges of areas in the watercolor simulation covered by a wash. Also, the method may include determining a diffusion of a wash through the capillary layer, thereby increasing a wet-area in the watercolor simulation, to simulate a backrun effect.

A user interface is provided that enables a user to selectively adjust parameters in at least a subset of the predefined parameters. The user interface further enables the user to select pigments that will be used in the watercolor simulation and the user can specify a color of a pigment based upon how the pigment appears when applied over a specific background color. In implementing this option, the user specifies the color components of the pigment as a function of its appearance as applied over both a black background and a white background; the color components are then used to determine a set of absorption coefficients and scattering coefficients for each pigment.

When creating a watercolor simulation interactively, the user selects at least a subset of the predefined parameters that will be applied to each layer, and provides a wet-area mask for at least one layer.

Alternatively, the watercolor simulation may be based on a color image that is not a watercolor. In this case, the method further includes the step providing a color image for conversion to the watercolor simulation. Mattes are extracted for specific portions of the color image. An ordered set of pigments to be applied to the mattes, and color separations for the ordered set of pigments are determined. Automatic brushstroking is applied when rendering the color separations. It is also contemplated that the color image may comprise a three-dimensional geometric model.

A further aspect of the present invention is directed at a system that includes a memory for storing a plurality of machine language instructions and a device for rendering the watercolor simulation. A processor is coupled to the device and to the memory and executes the machine instructions to implement a plurality of functions that are generally consistent with the steps of the above method.

BRIEF DESCRIPTION OF THE DRAWING FIGURES

The file of this patent contains at least one drawing executed in color. Copies of this patent with color drawing(s) will be provided by the Patent and Trademark Office upon request and payment of the necessary fee.

The foregoing aspects and many of the attendant advantages of this invention will become more readily appreciated as the same becomes better understood by reference to the following detailed description, when taken in conjunction with the accompanying drawings, wherein:

FIG. 3 is a table summarizing parameters used in the procedure of the present invention;

FIG. 4 is a table listing the parameters used for the images shown in Plates 1 and 3;

FIG. 5 is a table listing the optical parameters for pigments used in Plates 5A–5L;

Figure 1:
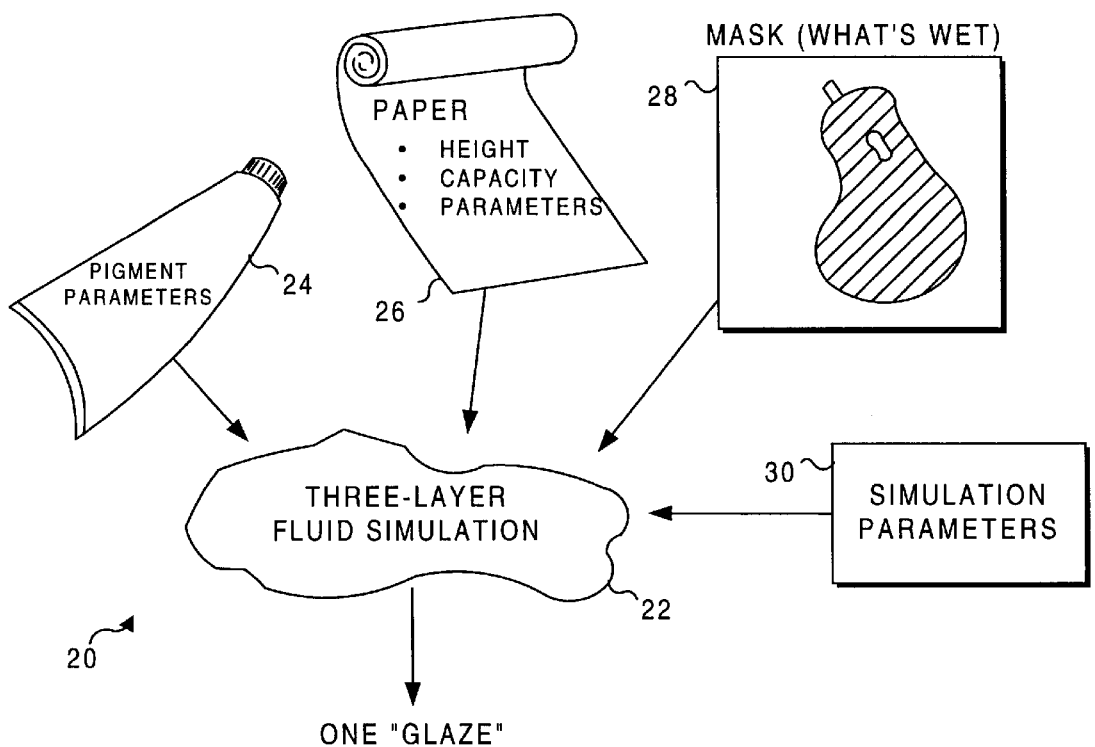
FIG. 1 is a schematic diagram showing the process used to create one glaze, where several glazes are combined to create the final rendered image.

PLATES 1A and 1B are color images created by the present invention, respectively demonstrating the effects of compositing a thick layer of Cerulean Blue over Quinacridone Rose, and a thick layer of Quinacridone Rose over Cerulean Blue;

PLATES 2A, 2B, and 2C are scanned color images of actual watercolors, respectively illustrating wet-on-dry, dry brush, and wet-on-wet brushing techniques commonly used in watercolor images;

PLATES 2D, 2E, and 2F are scanned color images of actual watercolors, respectively illustrating dark, branching reticulations around a light area, which are created as a puddle of water in a damp region of watercolor paint dries, the settling out of pigments, and the separation of pigments resulting in a splitting of colors in actual watercolors;

PLATES 3A–3F are color images rendered by the present invention demonstrating the effects of different parameters in the program;

PLATES 4A–4F are color images rendered by the present invention showing the effects of compositing different pigments over each other;

PLATES 5A–5L are color images rendered by the present invention showing a palette of colors, with each pigment appearing as a layer of graded thickness over both a white background and a black background;

PLATES 6A–6E are color images illustrating examples of synthetic paper textures produced by the present invention;

PLATES 7A–7L are color images of an apple and a pear generated by the present invention, showing a plurality of different color separations;

PLATES 8A–8C are color images generated by the present invention, illustrating the layering of colors, the hand-drawn appearance of the resulting image, and the automatic brush stroking effect; and PLATES 9A–9F are scanned color images showing different colored areas of an apple and a pear.

DESCRIPTION OF THE PREFERRED EMBODIMENT

Properties of Watercolor

For centuries, ground pigments have been combined with water soluble binding materials and used in painting. The earliest uses of watercolor were as thin colored washes painstakingly applied to detailed pen-and-ink or pencil illustrations. The modern tradition of watercolor, however, dates back to the latter half of the eighteenth century, when artists began to experiment with new techniques such as wiping and scratching out, and with the immediacy and spontaneity of the medium. In order to simulate watercolors effectively, it is important to study not only the physical properties of the medium, but also the characteristic phenomena that make watercolor so popular to artists. A simulation of this medium will only be successful if it can achieve many of the same effects. The following discussion addresses this problem.

To properly simulate watercolor images, it is first necessary to understand the components used in creating such images. A watercolor is created in the conventional manner by applying a suspension of pigment particles in a solution of water, binder, and sulfactant to paper. A pigment is a solid material in the form of small, separate particles. Watercolor pigments are typically ground in a milling process into a powder made of grains ranging from about 0.05 to 0.5 microns. Pigments can penetrate into the paper, and are helped in this regard by the surfactant. However, once in the paper they tend not to migrate far from the point of application. Pigments vary in density, and lighter pigments tend to stay suspended in water longer than heavier ones, and thus can spread farther across paper. Staining power, an estimate of the pigment's ability to adhere to or coat paper fibers, also varies between pigments. Certain pigments exhibit granulation, in which particles settled into the hollows of rough paper. Others exhibit flocculation, in which particles are drawn together into clumps, usually by electrical effects. Flocculation is similar in appearance to granulation, and can occur on smooth as well as rough paper.

The binder is used in watercolors to help bind the pigment to the paper (which is also known as "adsorption of the pigment by the paper"). The binder also plays a role in binding the pigment to itself—particularly when thick layers of paint are applied. Without a binder, most of the pigment particles would blow away once the paper dries. However, for thin layers of paint, the mechanical ability of paper fibers to hold pigment particles is at least as significant as the effect of the binder, as anyone who has tried to scrub away watercolor paint knows. The most common binder is gum arabic, which is derived from the stems of certain acacia trees.

Surfactants, or wetting agents, are added to lower the surface tension between two materials—in this case, between the pigment and the binder, as well as between the water and the paper. The surfactant improves the uniform flow of water over the surface of the paper and also helps the water to penetrate into the paper. In this latter sense, the surfactant counteracts the effect of sizing in the paper, which is described below. The surfactant also increases the rate of evaporation of the water, which in turn reduces granulation and flocculation effects of pigments. Oxgall is a commonly used wetting agent for watercolor.

Watercolor images are created by the application of water and paint to paper. Watercolor paper is typically not made from wood pulp, but instead from linen or cotton rags pounded into small fibers. The paper itself is mostly air, laced with a microscopic web of these tangled fibers. Such a substance is obviously extremely absorbent to liquids, and so the paper is impregnated with sizing so that liquid paints may be used on it without immediately soaking in and diffusing. Sizing is usually made of cellulose. It form's a barrier that slows the rate of water absorption and diffusion. For watercolor papers, sizing is typically applied sparingly and just coats the fibers and fills some of the pores, leaving the paper surface still rough.

The final appearance of watercolor derives from the interaction between the movements of various pigments in a flowing medium, the adsorption of these pigments by the paper, the absorption of water into the paper, and the eventual evaporation of the water medium. Obviously, these interactions are quite complex in nature and can be used by a skilled artist to achieve a wide variety of effects, as described in the next section.

Watercolor Effects

Watercolor can be used in many different ways, but there are three basic brushing techniques, including:

Wet-on-dry: A wet brush is applied to dry paper. An example of this technique is shown in Plate 2A. The sizing in the paper, coupled with the surface tension of water, does not allow the brushstroke to spread. Instead, in a gradual process, the interior of the painted region lightens slightly, and the edges of the painted region darken significantly as the paint begins to dry. It is suspected that this phenomenon is caused by faster evaporation at the edges of the painted region due to a relatively greater surface area, which in turn pulls more water and pigment to the edges. Whatever its causes, the edge darkening is an important effect that watercolor artists rely upon and that paint manufacturers take pains to ensure in their watercolor paint formulations. Granulation is another important wet-on-dry effect for certain pigments.

Dry brush: A brush that is almost out of paint can be used to create strokes with a rough, ragged texture, with the paint adhering only to the raised areas of the rough paper. In this case, white pinpoints of dry paper continue to show through. Plate 2B illustrates this technique.

Wet-on-wet: A wet brush is applied to wet paper. The wet surface allows the brushstrokes to spread, exhibiting soft, feathery flow patterns. Some pigments will also tend to granulate where the paper is particularly wet, as illustrated in Plate 2C.

In addition, there are a number of standard effects that can be reliably employed by the watercolor expert. These include:

Intentional backruns: Dark, branching reticulations around a light area are created as a puddle of water in a damp region of paint dries. This effect is illustrated in Plate 2D.

Settling out and separation of pigments: Settling out of pigments yields a kind of grainy texture. Separation exhibits a splitting of colors, with the lighter-weight pigments generally traveling farther from the initial brush position. These two effects are illustrated respectively in Plates 2E and 2F.

Plates 2A–2F are scanned-in images of real watercolors. Plates 1A–1B and 3A–3F illustrate similar effects obtained with watercolor simulations created using the present invention.

One other very important technique in watercolor is the process of color glazing. Glazing is the process of adding very thin, pale layers, or washes, of watercolor, one over another, in order to achieve a very clear and even effect. Each layer of watercolor is added after the previous layer has dried. More expensive watercolor paints are specially formulated to have a low resolubility, which not only allows thin uniform washes to be overlaid, but in fact allows any type of brushing technique to be employed over a dried wash (including dry brush and wet-on-wet) without disturbing the underlying layers.

Glazing is different from ordinary painting in that the different pigments are not mixed physically, but optically— in their superposition on the paper. Glazes yield a pleasing effect that is often described as "luminous," or as "glowing from within." It is believed that this subjective impression arises from the wet-on-dry effect in which a watercolor brushstroke becomes slightly lighter on its interior and markedly darker at its boundary. This effect is intensified with multiple wet-on-dry washes. These subtle variations in tone are probably responsible for this "luminous" appearance.

Computer Generated Watercolor Model

Implementing all of these artistically important effects automatically presents an interesting challenge, particularly given the paucity of available information on the physical processes involved. A model must be developed to artificially simulate the physical and optical behavior of watercolors. The details of this model are described below. In the description of the present invention and in the claims that follow, the watercolor simulation is discussed in terms that at times may seem to be directed to an actual watercolor rather than a simulation. The watercolor simulation is defined based upon certain real parameters that would affect the appearance of a real watercolor, but it should be understood that these parameters are virtual parameters. Thus, for example, when the following discussion refers to the "texture of the paper" on which the watercolor simulation is being rendered, it should be apparent that this reference simply applies to the modeling of the surface on the watercolor simulation is rendered—not to an actual paper. Similarly, references to a "wet-area" refer to an area that is modeled as wetted by water—and not to an actual wetted region. These and many other terms used below that seem to relate to aspects of an actual watercolor thus simply refer to those aspects in the model used to produce the watercolor simulation.

The approach employed in building a watercolor model has been to start with physically-based equations, such as the shallow water equations, and then to add terms as necessary to create the desired effects. Thus, while the model is motivated by the physical phenomena, it is not a strict physical simulation. It does, however, do a reasonably good job of synthesizing the most salient watercolor effects.

A complete painting is preferably represented in the model as an ordered set of translucent layers, or washes, applied over a sheet of rough paper. Each wash may contain various pigments in varying quantities over different parts of the image. Information about these pigments is stored in a data structure called a "glaze." In the present invention, a glaze is a set of floating-point image arrays with one array, or channel, for each pigment in the wash. The floating-point numbers in a given channel represent the quantity of the corresponding pigment present at each pixel in the watercolor image.

Each glaze is created independently by running a fluid simulation that computes the flow of paints over the paper. FIG. 1 presents an overview 20 of the functional components employed in this process for producing a three-layer fluid simulation 22. The simulation takes as input pigment parameters 24 that control the physical properties of pigments (size, rate of adsorption, etc.), physical properties 26 of the paper (surface height, water capacity, etc.), and simulation parameters 30 (size of time step, etc.). In addition, the simulation makes use of wet-area masks 28, which represent the damp areas of paper. These masks control where water is allowed to flow, and therefore the limits of the fluid flow computation. The masks may expand during simulation if water diffusing through the bottom layer would have caused the paper to become damp. The next section describes this fluid simulation in detail. Once the glazes are computed, they are optically composited using a Kubelka-Munk (KM) color model to provide the final visual effect, as described below.

The Fluid Simulation

Figure 2:
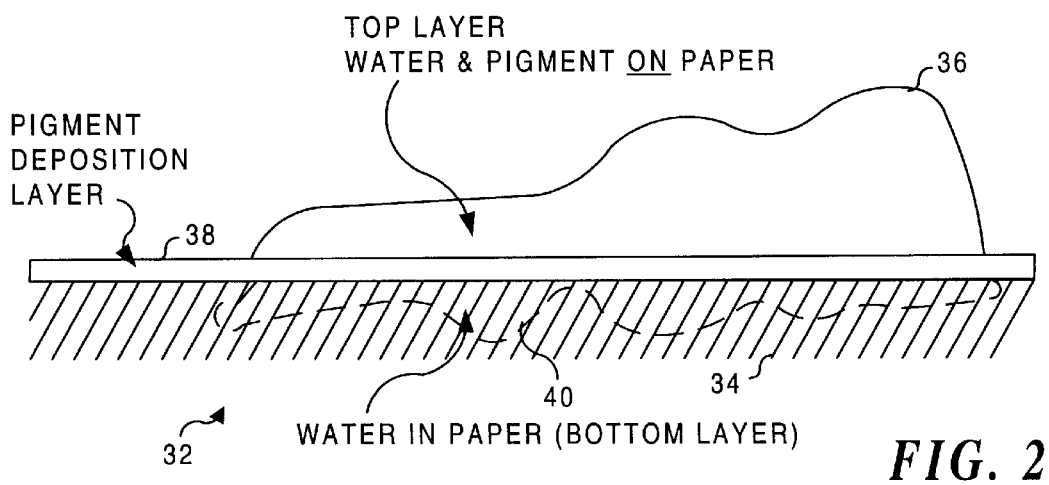
FIG. 2 is a side cross-sectional view of a three-layer model for a single glaze applied to paper.

In this simulation, each individual wash is simulated using a three-layer model 32, as illustrated in FIG. 2. From top to bottom, as shown in this view, these three layers include:

a shallow water layer 36—where water and pigment flow above the surface of a paper 34;

a pigment deposition layer 38—where pigment is deposited onto ("adsorbed by") and lifted ("desorbed") from the paper.

a capillary layer 40—where water that is absorbed into the paper is diffused by capillary action.

The shallow water layer is represented by a spatially-discretized height field, together with a set of arrays representing the quantities of different pigments at each spatial location. A modified version of the shallow water equations is used to compute fluid flow above the paper. The pigment deposition layer represents pigment attached to the paper. Shallow water layer 36 interacts only with the shallow water layer above it, and not with the capillary layer below. The capillary layer uses another height-field representation of water flowing within the paper. This layer is used to expand or shrink the wet-area masks, which creates backrun effects.

In the following derivations and pseudo code, letters in italics (such as u and v) are used to represent scalar quantities, and bold italics (such as u and v) are to represent arrays of these quantities, discretized over a discrete set of cells in the simulation.

Main Logic Loop of the Computer Model

The main loop of the simulation takes as input the initial quantities of water in the shallow water and capillary layers, denoted p and q, respectively; and the initial amount of each pigment i in the shallow water and pigment deposition layers, denoted gs[i] and gd[i], respectively. It also uses two scalar parameters u and k, which control the viscosity of the fluid, and friction of the fluid against the paper.

Figure 6:
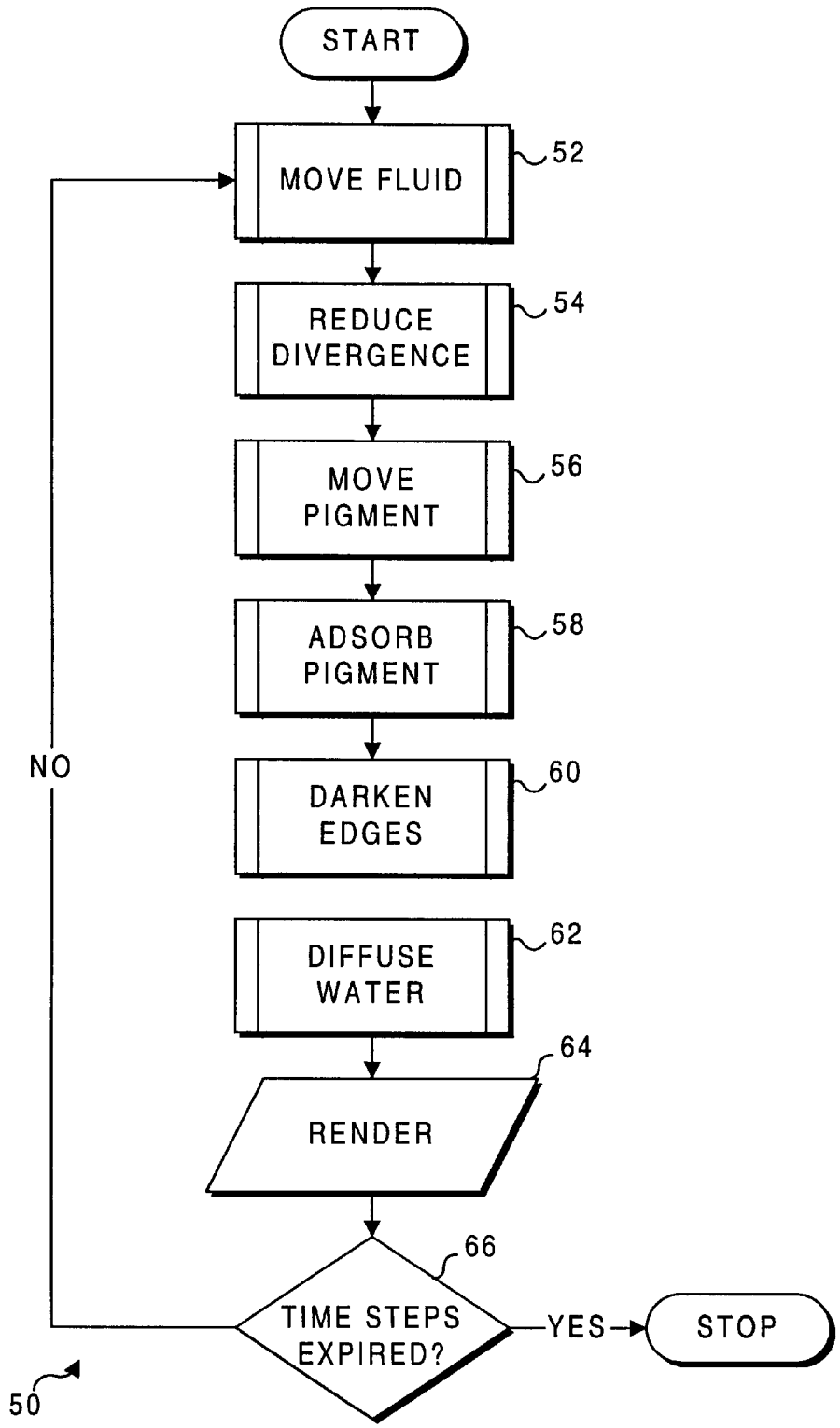
FIG. 6 is a flow chart showing the main loop logic used for generating a watercolor image in accord with the present invention.

The main loop iterates over a specified number of time steps, performing various aspects of the fluid simulation and outputting a frame at the end of each step. (These frames can be concatenated into an animated sequence for inclusion into video. As is typical of an animation, one or more objects depicted in the simulations may change position over a series of such frames, so that when the frames are successively displayed sufficiently fast, the object appears to move.) Alternately, just the final frame can be used to display just a finished watercolor painting. A flow chart 50 illustrating the logic implemented in the main loop is provided in FIG. 6, and the following pseudo code includes references to blocks in this Figure. The code proceeds as follows:

```
proc MainLoop(u,v,gs,gd):
    foreach time step do
        /* Move water and pigments in shallow water layer,
           as indicated in a block 52 */
        MoveFluid(u, v,p, u, k, paperslope)
        /* Redistribute fluid into neighboring cells to reduce
           divergence, as noted in a block 54 */
        ReduceDivergetice(u, v, p, relax, maxdiv, maxsteps)
        /* Reduce pigment in each cell based on rate of fluid
           movement out of cell, as noted in a block 56 */
        MovePigment(gs[1. . . npigs], u, v, Δt)
        /* Adsorb pigment into paper, in accord with a block
           58 */
        AdsorbPigment(gs[1. . . npigs], gd[1. . . npigs], b,
           deposit[1. . . npigs], lift[1. . . npigs], exposure[1.
           . . npigs])
        /* As water evaporates, darken edges slowly, as
           provided in a block 60 */
        DarkenEdges(p, mask, edgeKer, darkening)
        /* Move water in capillary layer, to simulate
           diffusion, as noted in a block 62. For backrun
           effects only. */
        DiffuseWater(q, mask, absorption, ε, δ, σ)
        /* Use the KM model to render the simulation by
           compositing the layers, as provided in a block 64
           */
        Render(gs[1. . . npigs], gd[1. . . npigs])
        /* As indicated in a decision block 66, continue
           looping within the FOR loop to block 52 until the
           time steps have expired */
    Endfor
    /* After all of the time steps have expired, stop the
       process */
endproc
```

Moving Water in the Shallow Water Layer

Figure 7:
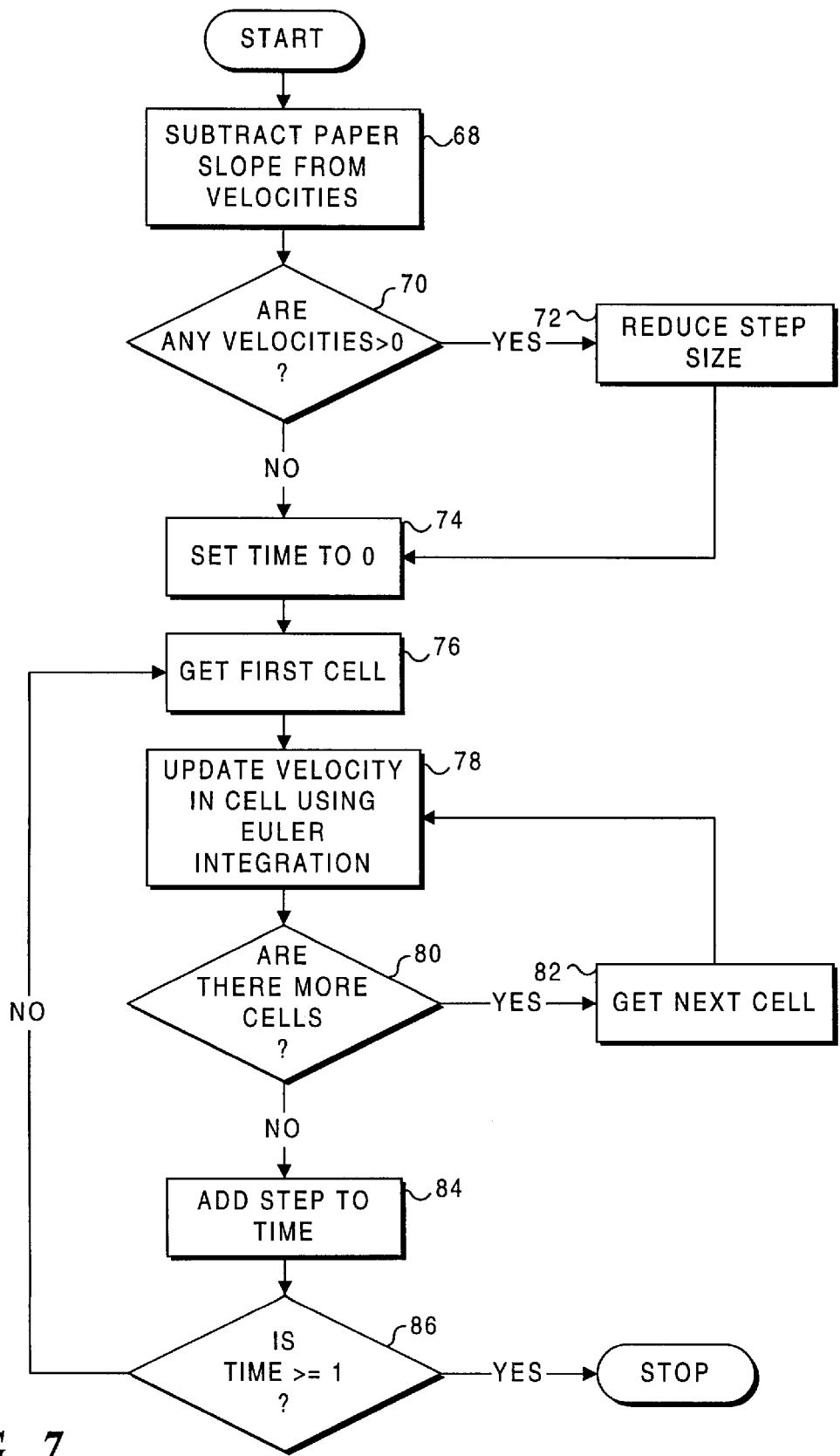
FIG. 7 is a flow chart illustrating the logical steps for moving fluid that is used when generating the watercolor image.

Details of block 52 are illustrated in FIG. 7. However, before discussing the logical steps employed in moving water in the shallow water layer, certain parameters that are used in the simulation should be defined and explained. Let p be the fluid pressure in a cell, which is proportional to the quantity of fluid in the cell (denoted by p in the pseudo code). Also let u and v denote the fluid velocities in the x and y directions. The following modified shallow water equations are used in the simulation:

$$\frac{\partial u}{\partial t} = \left(\frac{\partial u^2}{\partial x^2} + \frac{\partial uv}{\partial y^2}\right) + u\Delta^2 u - \frac{\partial p}{\partial x} - (k_d e^{-0.1p})u \quad (1)$$

$$\frac{\partial u}{\partial t} = \left(\frac{\partial v^2}{\partial y^2} + \frac{\partial uv}{\partial x^2}\right) + u\Delta^2 v - \frac{\partial p}{\partial y} - (k_d e^{-0.1p})v \quad (2)$$

These equations are spatially discretized on a staggered grid. The staggered grid representation stores velocity values at grid cell boundaries and other values (pressure, pigment, etc.) at grid cell centers. The standard notation for staggered grids is used: integer indices (like the "i" and "j" in $p_{i,j}$) are grid cell centers, and indices incremented or decremented by ½ (like "i+½" in $u_{i+\frac{1}{2},j}$) are used for grid cell boundaries. The equations are discretized in time and solved forward using Euler's Method, with an adaptive step size. The step size is reduced if velocities exceed one pixel per time step.

A gravity term is added to account for the local slope paperslope of the surface of the paper. This term is added to the velocities before the fluid step is computed.

The final pseudo code (with reference to the corresponding blocks in FIG. 7) for integrating the fluid simulation forward one time unit is as follows:

proc MoveFluid(u, v, p, k, u, Δt, paperslope)
  /* Subtract paper slope from velocities u and v, as noted in a block 68 */
  u-=paperslope$_x$
  v-=paperslope$_y$
  /* Determine if either velocity is greater than zero, as provided in a decision block 70 */
  if (max(u)>1 or max(v)>1)
    /* If so, then reduce the step size, in accord with a block 72 */
    then reduce stepsize Δt
  /* Otherwise, set time to zero, as noted in a block 74, get the first cell, as noted in a block 76, and begin a loop */
  for t from 0 to 1 by Δt do
    forall cells (i,j) do
      /* Update the velocity in current cell using Euler integration, as indicated in a block 78 */

$\hat{u}_{i+\frac{1}{2},j}=u_{i+\frac{1}{2},j}+\Delta t(\frac{1}{4}(u_{i-\frac{1}{2},j}+u_{i+\frac{1}{2},j})^2-\frac{1}{4}(u_{i+\frac{1}{2},j}+u_{i+\frac{3}{2},j})^2$ $+\frac{1}{4}(u_{i+\frac{1}{2},j-1}+u_{i+\frac{1}{2},j})(v_{i,j-\frac{1}{2}}+v_{i-1,j+\frac{1}{2}})$ $-\frac{1}{4}(u_{i-\frac{1}{2},j}+u_{i+\frac{1}{2},j+1})(v_{i,j+\frac{1}{2}}+v_{i+1,j+\frac{1}{2}})$ $+u(u_{i+\frac{3}{2},j}+u_{i-\frac{1}{2},j}+u_{i+\frac{1}{2},j+1}+u_{i+\frac{1}{2},j-1}-4u_{i+\frac{1}{2},j})$ $+(p_{i,j}-p_{i+1,j})-ke^{-0.1(pi,j+pi+1,j)/2}u_{i+\frac{1}{2},j})$ $\hat{v}_{i,j+\frac{1}{2}}=v_{i,j+\frac{1}{2}}+\Delta t(\frac{1}{4}(v_{i,j-\frac{1}{2}}+v_{i,j+\frac{1}{2}})^2-\frac{1}{4}(v_{i,j+\frac{1}{2}}+u_{i,j+\frac{3}{2}})^2$ $+\frac{1}{4}(u_{i-\frac{1}{2},j}+u_{i-\frac{1}{2},j+1})(v_{i-1,j+\frac{1}{2}}+v_{i,j+\frac{1}{2}})$ $-\frac{1}{4}(u_{i+\frac{1}{2},j}+u_{i+\frac{1}{2},j+1})(v_{i,j+\frac{1}{2}}+v_{i+1,j+\frac{1}{2}})$ $+u(v_{i+1,j+\frac{1}{2}}+v_{i-1,j+\frac{1}{2}}+v_{i,j+\frac{3}{2}}+v_{i,j-\frac{1}{2}}-4v_{i,j+\frac{1}{2}})$ $+(p_{i,j}+p_{i,j+1})-ke^{-0.1(pi,j+pi,j+1)/2}v_{i,j+\frac{1}{2}})$ /* Determine if there are any more cells, as noted in a decision block 80, and if so, get the next cell, as provided in a block 82. Once all cells have been processed, add a step to time, as provided in a block 84 */
    endfor
    /* Determine if current time is greater than or equal to one, in a decision block 86, and if so, stop; otherwise, loop back block 76 in an outer FOR loop, to repeat the step in block 78 for each cell /*
  endfor
  u=û
  v=v̂
endproc

Reducing Divergence

Figure 8:
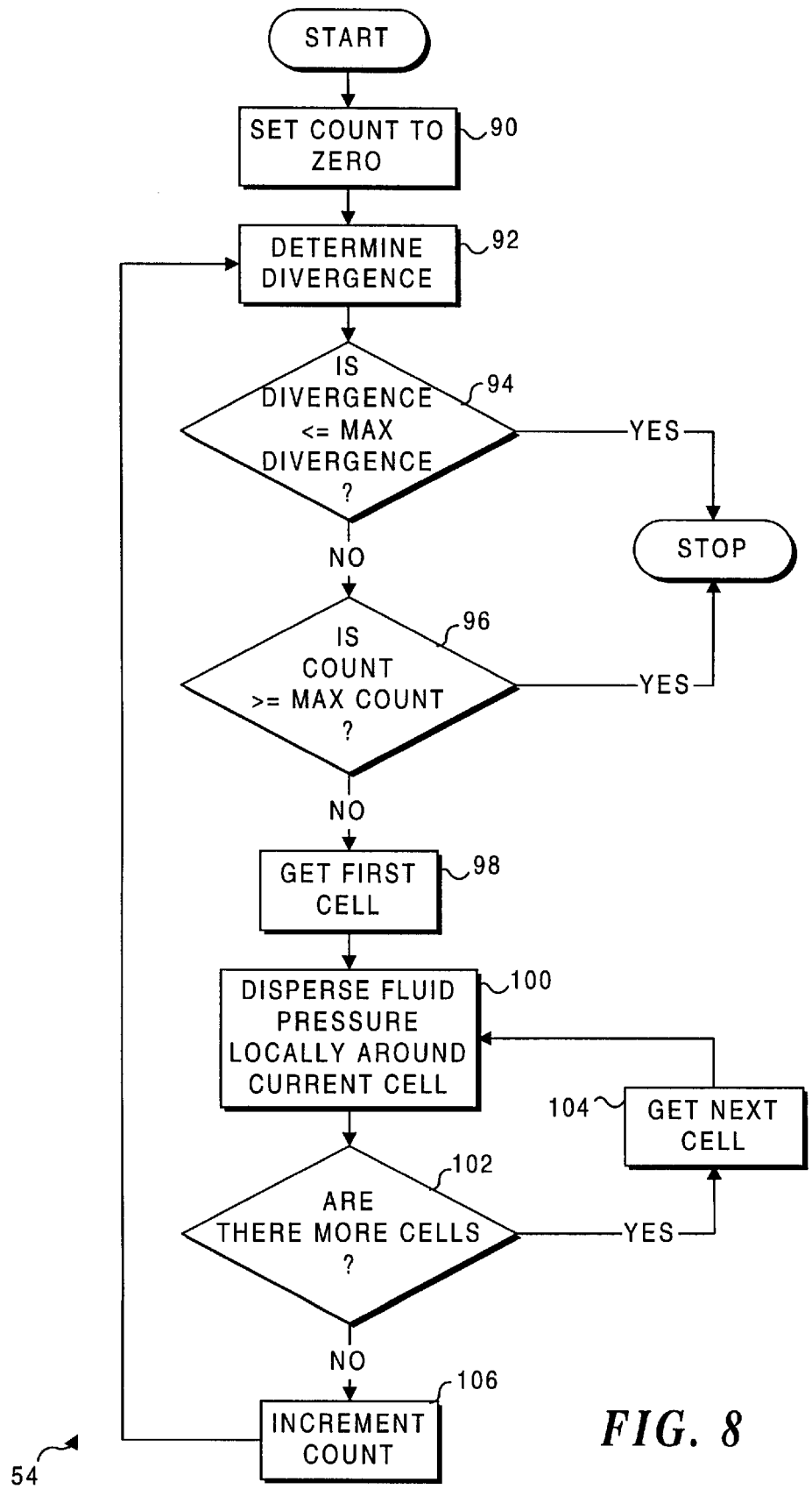
FIG. 8 is a flow chart illustrating the logical steps used to reduce divergence in the present invention.

The present invention provides for reducing the divergence of the velocity field ($\partial u/\partial x+\partial v/\partial y$) after each time step until it is less than maxdiv by redistributing the fluid into neighboring grid cells. This step does not have as clear a physical basis in the two-dimensional (2D) shallow water simulation as it has in a related prior art three-dimensional (3D) simulation. However, the step appears to make a significant difference for reducing ringing artifacts in the simulation, and has thus been found to be useful. In this approach, relax, maxdiv and maxsteps are parameters that control aspects of the simulation (see the table in FIG. 3 for the symbols/values used in a current preferred embodiment, their definitions, and an indication of the procedure in which these symbols/values are used). The steps implemented in reducing divergence are shown in FIG. 8 and the blocks describing these steps and corresponding pseudo code are as follows:

proc ReduceDivergence(u, v, p, relax, maxdiv, maxsteps)
  local dp, div, count, maxdp;
  /* A block 90 sets a count to zero to initialize the process. The divergence is determined, as noted in a block 92, and a decision block 94 provides for determining whether the divergence is less than or equal to the maximum divergence, maxdiv, and if so, the procedure stops. If not, a decision block 96 determines if the count is greater than a maximum count, maxsteps, and if so, the procedure stops */
  while ((div>maxdiv) and (count<1maxsteps)) do
  /* If the response to both decision blocks 94 and 96 is negative, a block 98 provides for getting a first cell, as the initial step in an inner loop */
    forall cells (i,j) do
      /* Fluid pressure is dispersed locally around current cell, as noted in a block 100 */
      dp=-relax*($u_{i+\frac{1}{2},j}-u_{i-\frac{1}{2},j}+v_{i+\frac{1}{2},j}-v_{i-\frac{1}{2},j}-$)
      $p_{i,j}$+=dp /* Note: p modified in place */
      $\hat{u}_{i+\frac{1}{2},j}$+=dp
      $\hat{u}_{i-\frac{1}{2},j}$-=dp
      $\hat{v}_{i,j+\frac{1}{2}}$+=dp
      $\hat{v}_{i,j-\frac{1}{2}}$-=dp
      maxdp=max(dp, maxdp)
      /* A decision block 102 determines if there are any more cells to be processed, and if so, a block 104 provided for getting the next cell for input to the process in block 100 */
    endfor
    /* If there are not any more cells to be processed in decision block 102, a block 106 provides for incrementing the count, and then the process loops back to block 92 */

```
        count+=1
    endwhile
    u=û
    v=v̂
    return maxdiv
endproc
```

Moving Pigments in the Shallow Water Layer

Figure 9:
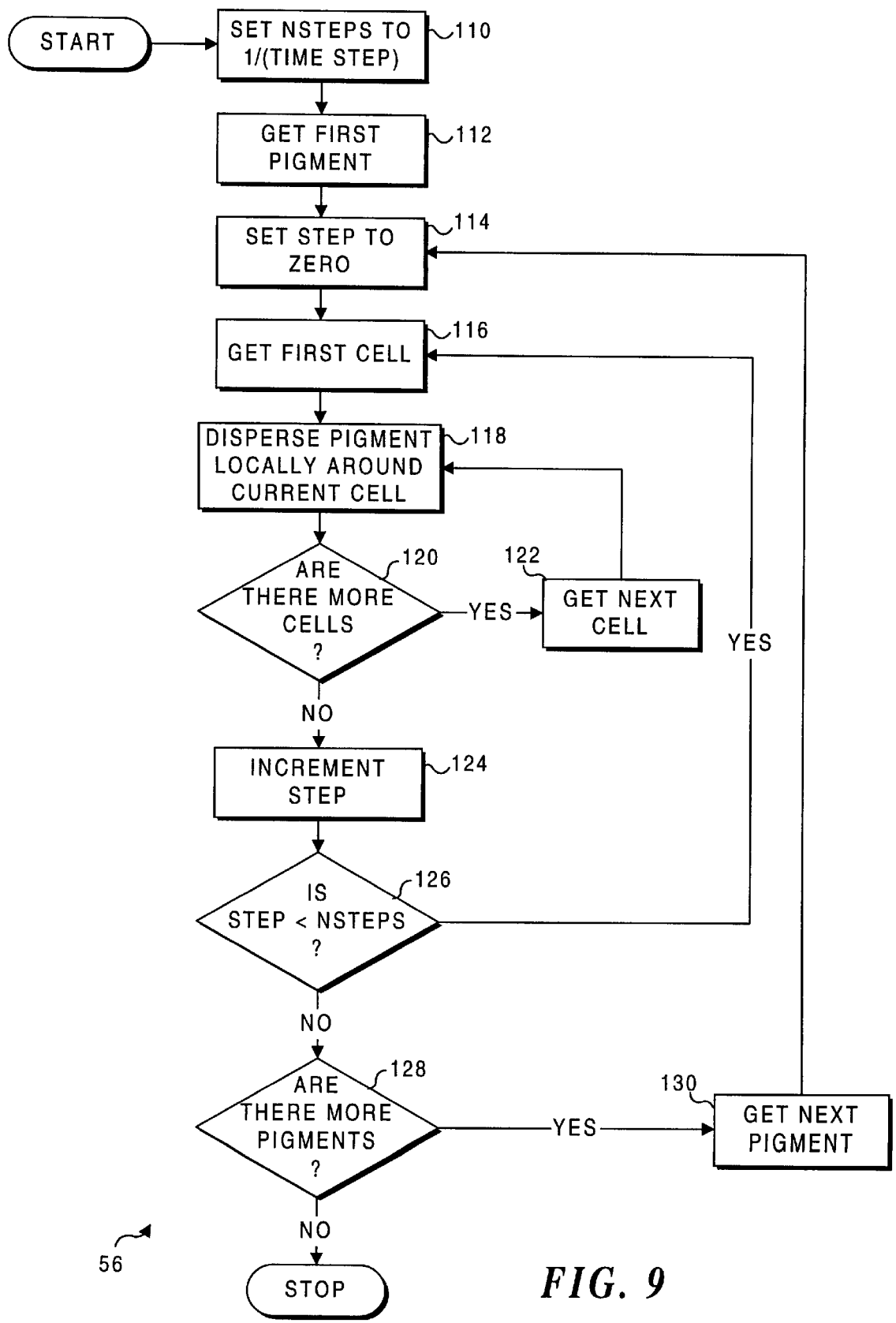
FIG. 9 is a flow chart illustrating the logical steps employed when moving pigment in the present invention.

Pigments move within the top layer as specified by the velocity field u, vcomputed for the water set forth above. In this part of the simulation, the relative quantity of pigment in each cell is reduced according to the rate of fluid movement out of the cell. This pigment is then distributed to the neighboring cells appropriately, as defined by the steps indicated in the blocks of FIG. 9 and by the following pseudo code, which corresponds to the blocks as indicated:

```
proc MovePigment(gs[1. . . upigs], u, v, Δt)
    /* A block 110 provides for setting the variable
       NSTEPS to the reciprocal of the time step */
    nsteps=1/Δt
    /* A block 112 provides for getting the first pigment
       included in the pigments used, a block 114 sets the
       step to zero, and a block 116 provides for getting the
       first cell */
    forall p∈pigs do
        for nsteps do
            ĝŝ=gs
            forall cells (i,j) do
                /* A block 118 provides for dispersing the
                   current pigment locally around the current cell;
                   a decision block 120 then determines if there
                   are any more cells, and if so, a block 122
                   provides for getting the next cell, so that the
                   dispersion process implemented in block 118
                   can be repeated for the next cell. If not, a block
                   124 indicates that the step variable is incre-
                   mented before proceeding with a decision
                   block 126 */
                ĝŝ[p]_{i+1,j}-=max(u_{i+½,j} gs[p]_{i,j} 0)
                ĝŝ[p]_{i-1,j}-=max(-u_{i-½,j} gs[p]_{i,j} 0)
                ĝŝ[p]_{i,j+1}-=max(v_{i,j+½} gs[p]_{i,j} 0)
                ĝŝ[p]_{i,j-1}-=max(v_{i,j-½} gs[p]_{i,j} 0)
                ĝŝ[p]_{i,j}-=max(u_{i+½,j}gs[p]_{i,j} 0)+max(-u_{i-½,j} gs[p]_{i,j},0)+max(v_{i,j+½} gs[p]_{i,j},0)+max(v_{i,j-½}gs[p]_{i,j}, 0)
                /* Decision block 126 determines if the current
                   value of the step variable is less than that of the
                   variable nsteps, and if so, the logic loops back
                   to block 116. Otherwise, the logic proceeds to
                   a decision block 128, which determines if there
                   are any more pigments to be processed, and if
                   so, a block 130 provides for getting the next
                   pigment, before looping back to block 114 */
            endfor
            gs=ĝŝ
        endfor
    endfor
    /* A negative response to decision block 128, termi-
       nates the process */ p=p̂
endproc
```

Pigment Adsorption and Desorption

Figure 10:
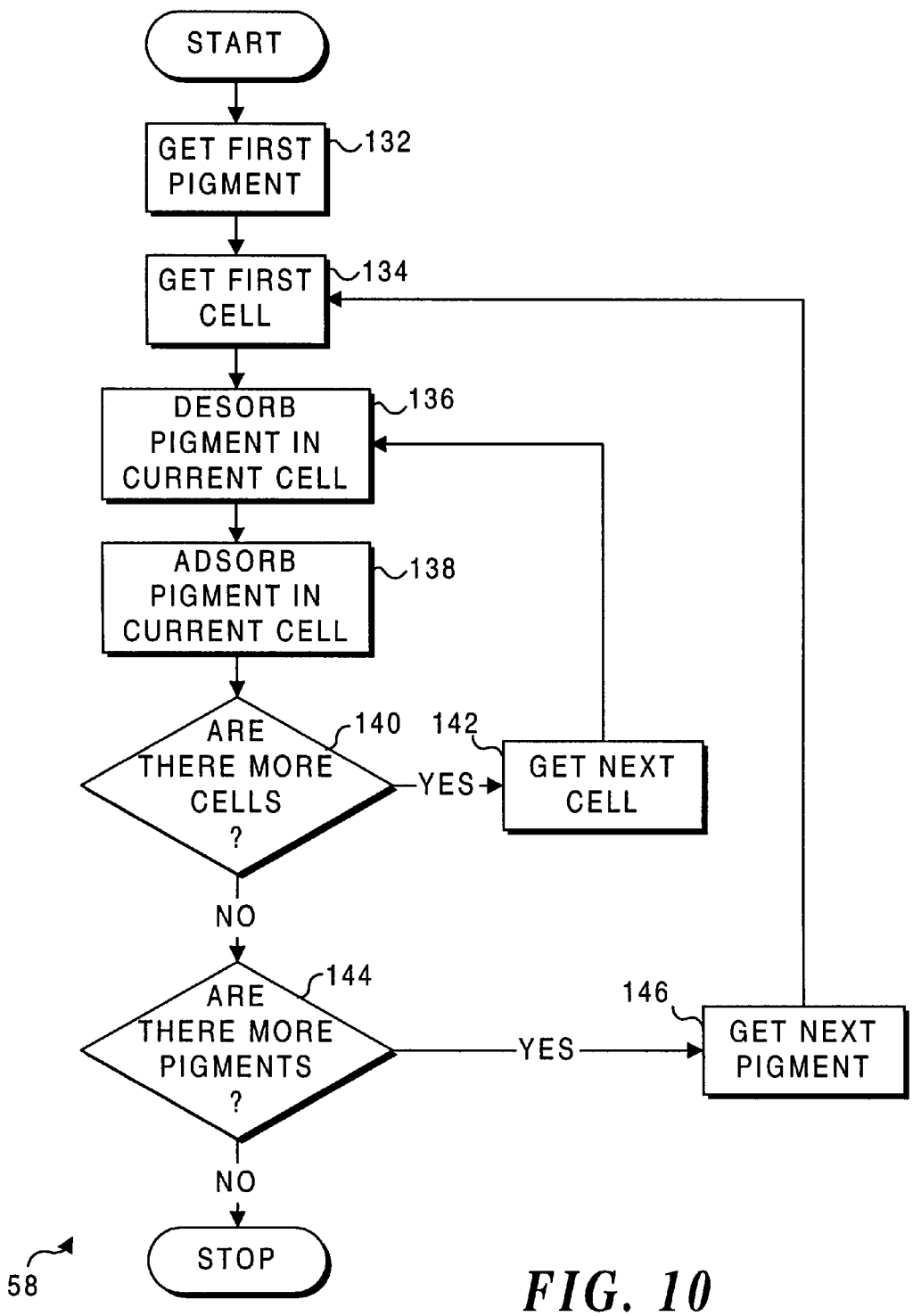
FIG. 10 is a flow chart showing the steps used for simulating adsorbing pigment in the present invention.

At each step of the simulation, pigment is also adsorbed by the pigment deposition layer at a certain rate, and desorbed back into the fluid at another rate. Note that any initial pigment placed outside of any wet-area mask 28 is immediately entirely adsorbed by the pigment deposition layer. The parameters deposit[p] and lift[p], which are included in the table of FIG. 3, are scalars representing the rate of adsorption and desorption. These parameters determine how quickly pigment is deposited onto the paper. The exposure[p] parameter determines how much the paper height b affects lift and deposit rates, and its value can be selected so as to imitate pigments that are heavier and tend to sediment out into the valleys of the paper. FIG. 10 shows the logical steps implemented in this adsorption/desorption process, and these steps are reflected in the following pseudo code, which defines the AdsorbPigments procedure:

```
proc AdsorbPigment(gs[1. . . npigs], gd[1. . . npigs], b,
    deposit[1. . . npigs], lift[1. . . npigs],
    exposure[1. . . npigs])
    /* A block 132 in the Figure provides for getting the first
       pigment, while a block 134 provides for getting the first
       cell */ local Ddown, Dup
    forall p∈npigs do
        forall cells(i,j) do
            /* As provided in a block 136, the pigment in the
               current cell is desorbed, while a block 138 notes
               that the pigment in the current cell is absorbed */
            Ddown=gd[p] lift[p] (1+exposure[p](b-1))
            Dup=gs[p] deposit[p] (1-exposure[p]b)
            if ((gd[p]+Ddown)>1)
                then Ddowin=max(1-gs[p], 0)
            if ((gs[p]+Dup)>1)
                then Dup=max(1-gd[p], 0)
            gd[p]+=Ddown-Dup
            gs[p]+=Dup-Ddown
            /* A decision block 140 determines if there are any
               more cells, and if so, a block 142 provides for
               getting the next cell prior to repeating the desorp-
               tion and adsorption process of block 136 and 138.
               If there are no more cells, the logic advances to a
               decision block 144 */
        endfor
        /* Decision block 144 determines if there are any more
           pigments, and if so, advances to a block 146, which
           provides for getting the next pigment */
    endfor
    /* A negative response to decision block 144 terminates
       the process */
endproc
```

Edge Darkening

Figure 11:
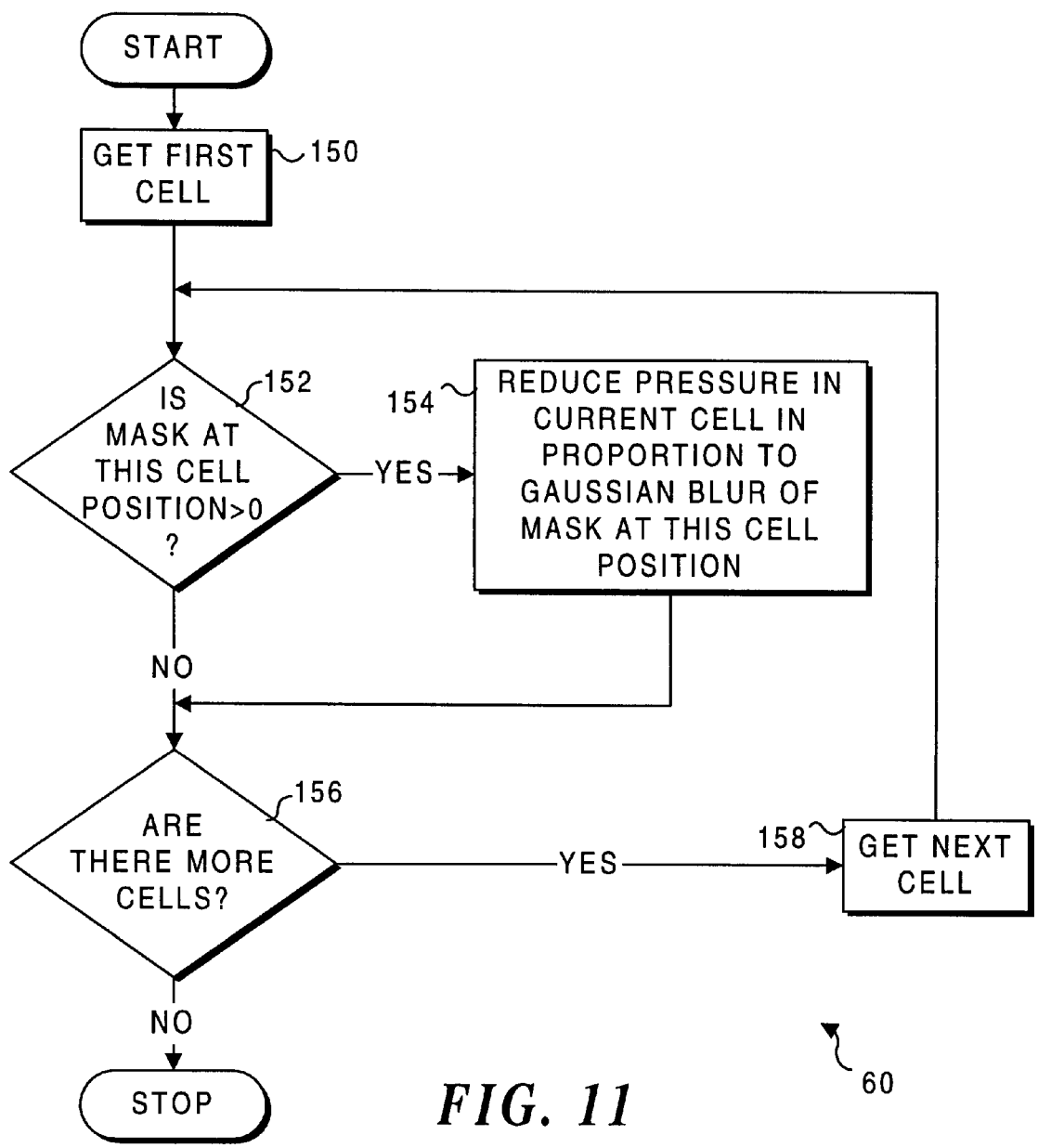
FIG. 11 is a flow chart showing the steps used for darkening edges in the present invention.
Figure 12:
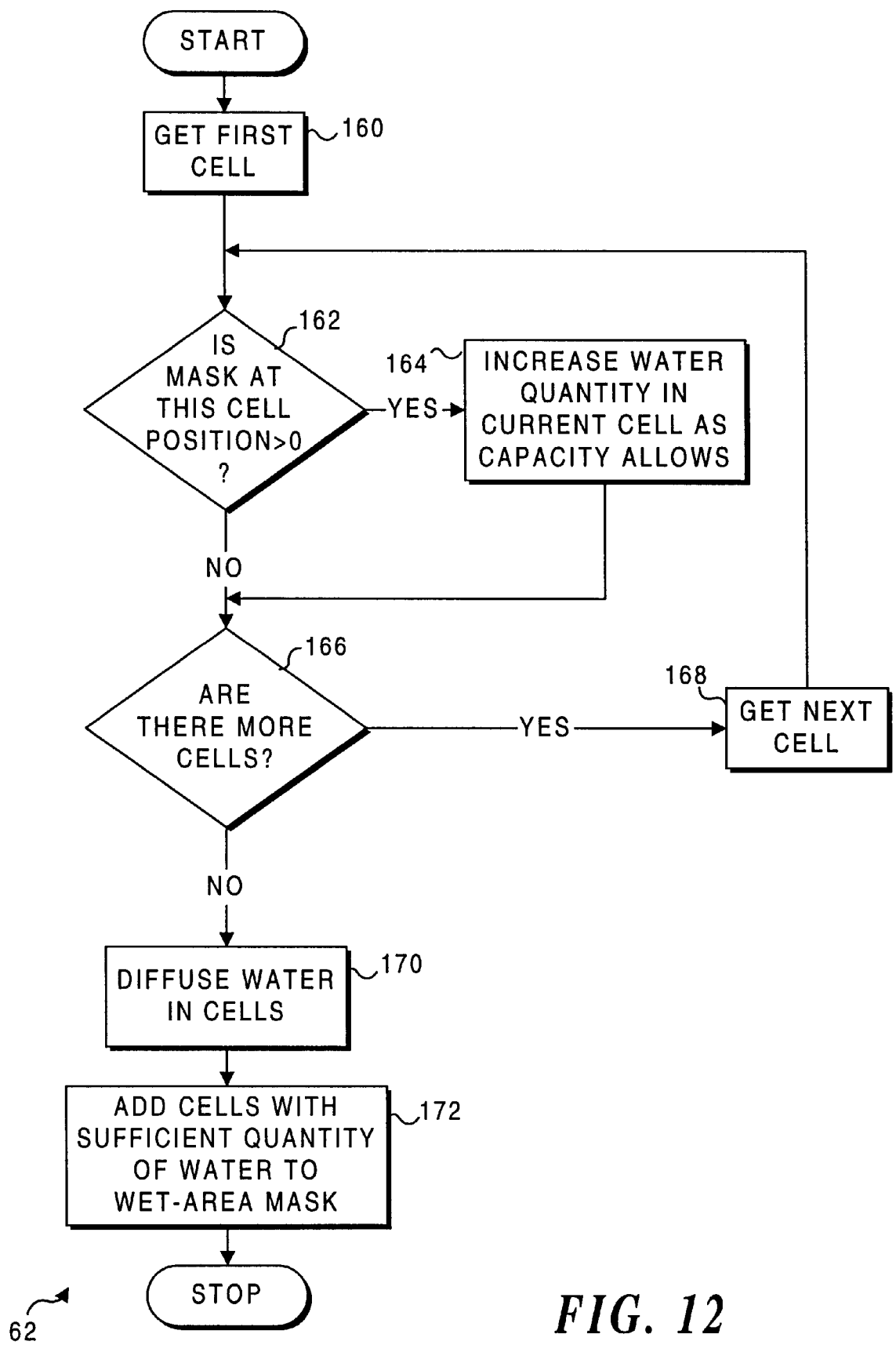
FIG. 12 is a flow chart illustrating the steps employed for creating the background effect in the present invention.

It is conjectured that edge darkening arises from increased evaporation near the edges of a small puddle, due to the relatively larger surface area of fluid per unit area of paper near the edge. The following routine, which corresponds to the logic shown in FIG. 11, simulates this effect, i.e., removing water from the edges. The water removal causes a slight fluid flow toward the edges and in turn brings in more pigment. The procedure and corresponding blocks are as follows:

```
proc DarkenEdges(p, mask, edgeKer, darkening)
    /* A block 150 provides for getting the first cell */
    blur=a Gaussian blurred version of mask with kernel
        edgeKer
    /* A decision block 152 determines if the mask at the
       current position is>zero, i.e., if the cell is within the
       mask area */
    forall cells (i,j) do
        if (mask_{i,j}>0)
            /* If the response to decision block 152 is
               affirmative, a block 154 calls for reducing fluid
               pressure in the current cell in proportion to the
               Gaussian blur of the mask at the current cell
               position */
``` then $p_{i,j}$ −=max(min(blur$_{ij}$* darkening, $p_{i,j}$), 0)
/* The logic proceeds to a decision block 156 if the response to decision block 152 is negative or after the step in block 154. Decision block 156 determines if there are any more cells, and if so, a block 158 provides for getting the next cell before looping back to decision block 152 */
endfor
/* A negative response to decision block 156 results in termination of the process */
endproc Diffusing Water through the Capillary Layer The following routine is used in the present invention to simulate the diffusion of water through the bottom, capillary layer, according to the paper's holding capacity pcap, which specifies the volume not occupied by paper fibers. This routine can also expand wet-area mask 28, which creates synthetic "backrun" effects. The routine takes as its parameters: ε, the minimum saturation a pixel must have before it can diffuse to its neighbors; δ, a value below which a pixel will not receive diffusion; and σ, the minimum saturation required to expand the wet-area to include a pixel. The logic implemented in the routine is illustrated in FIG. 12, with reference to the following pseudo code:

proc DiffuseWater(mask, pcap, q, absorption, ε, δ, σ)
/* A block 160 provides for getting the first cell */
forall cells (i,j) do
/* A decision block 162 determines if the mask at the current cell
position is greater than zero */
if (mask$_{i,j}$>0) then
/* An affirmative response to decision block 162 leads to a block 164, which provides for increasing the water quantity in the current cell as its capacity allows
/* $q_{i,j}$+=max(min(absorption, pcap$_{i,j}$−q$_{i,j}$), 0) */
endfor
/* Following a negative response to decision block 162 and after block 164, the logic proceeds to a decision block 166, to determine if there are any more cells, and if so, proceeds to a block 168, to get the next cell. A negative response to decision block 166 leads to a block 170 in which the water is diffused into the cells. A diffusion constant of about 0.25 is employed in the preferred embodiment, but flow is limited to the capacities of the neighboring cells. Also, there is no diffusion between two cells unless the sending cell has more than ε water, and the receiving cell has less than δ. The wet-area mask is shrink/expand. Add cells with water level above a to the wet-area mask, as indicated in a block 172 */
endproc Paper Generation Paper texture is modeled as a height field and a fluid capacity field. The height field is generated using one of a selection of pseudo-random processes. The fluid capacity per pixel is computed from the height field, cap=ht*(cap$_{max}$−cap$_{min}$)+cap$_{min}$. Some examples of synthetic paper textures on a simulated watercolor are shown in Plates 6A–6E.

Rendering the Pigmented Layers

The KM model is used to perform the optical compositing of glazing layers in the preferred embodiment of the present invention. In the present use of the KM model, each pigment is assigned a set of absorption coefficients K and scattering coefficients S. These coefficients are a function of wavelength, and control the fraction of energy absorbed and scattered back, respectively, per unit distance in the layer of pigment. In the preferred embodiment of the present invention, three coefficients each are used for K and S, representing Red, Green, Blue (RGB) components of each quantity.

Specifying the Optical Properties of Pigments

Typically, the K and S coefficients for a given colorant layer are determined experimentally, using spectral measurements from layers of known thicknesses. However, in the preferred embodiment of the present invention, it was much more convenient to allow a user to specify the K and S coefficients interactively, by choosing the desired appearance of a "unit thickness" of the pigment over both a white and a black background. Given these two user-selected RGB colors $R_w$ and $R_b$, respectively, the K and S values can be computed by a simple inversion of the KM equations, as follows:

$$S = \frac{1}{b} \cdot \coth^{-1}\left(\frac{b^2 - (a - R_w)(a - 1)}{b(1 - R_w)}\right) \quad (3)$$

$$a = \frac{1}{2}\left(R_w + \frac{R_b - R_w + 1}{R_b}\right) \quad (5)$$

$$b = \sqrt{a^2 - 1} \quad (6)$$

The above computations are applied to each color channel of S, K, R, and $R_b$ independently. In order to avoid any divisions by zero, it is required that $R_w$>$R_b$ for each color channel. (This restriction is reasonable even for opaque pigments, since the user is specifying reflected colors through just a thin layer, which should still be at least partially transparent.) While for most valid combinations of specified colors, the computed K and S values fall in the legal range of 0 to 1, for certain very saturated input colors, the scattering coefficient may actually exceed the value of 1 in some color channels. Though such a large value of S is clearly not possible for any physical pigment, no ill effects have been noted in the simulation from allowing such "out-of-range" values. (The situation is somewhat analogous to allowing an "alpha" opacity to lie outside the range 0 to 1, another non-physical effect that is sometimes useful.)

This simple method of specifying pigments has been found to be quite adequate for creating a wide range of realistic paints. In addition, the method is much easier than taking the kind of extremely careful measurements that would otherwise be required. The method also appears to be much more intuitive for most people than specifying the K and S values directly. Note the following examples:

Opaque paints, such as "Indian red," exhibit a similar color on both white and black. Such paints exhibit high scattering in the same wavelengths as their color, and high absolption in complementary wavelengths.

Transparent paints, such as "Quinacridone rose," appear colored on white, and nearly black on black. Such paints have low scattering in all wavelengths, and high absorption in wavelengths complementary to their color.

Interference paints, such as "Interference lilac," appear white (or transparent) on white, and colored on black. Such paints have high scattering in the same wavelengths as their color, and low absorption in all wavelengths.

In the same way, this method also makes it easy to specify paints that exhibit slightly different hues over black than white, such as "Hansa yellow." Plate 5H provides a visualization of the simulated color of this pigment as it is applied in layers of increasing thickness over both black and white backgrounds.

Optical Compositing of Layers

Given scattering and absorption coefficients S and K for a pigmented layer of given thickness d at a particular pixel, the KM model enables the reflectance R and transmittance T through the layer to be determined as follows:

$$R = \sin hbSd/c \qquad (7)$$

$$T = b/c \qquad (8)$$

where $$c = a \sin hbSD + b \cos hbSD \qquad (9)$$

Kubelka's optical compositing equations can then be used to determine the overall reflectance R and transmittance T of two abutting layers with reflectances $R_1$, $R_2$ and $T_1$, $T_2$, respectively:

$$R = R_1 + \frac{T_1^2 R_2}{1 - R_1 R_2} \qquad (10)$$

$$T = \frac{T_1 T_2}{1 - R_1 R_2} \qquad (11)$$

This computation is repeated for each additional glaze. The overall reflectance R is then used to render the pixel.

For individual layers containing more than one pigment of thicknesses $d_1, \ldots, d_n$, the S and K coefficients of each pigment i are weighted in proportion to that pigment's relative thickness $d_i$. The overall thickness of the layer d is taken to be the sum of the thicknesses of the individual pigments.

Pigment Examples

Plates 5A–5L show the palette of colors used in the examples, with each pigment appearing as a layer of graded thickness over white and over black. The values used for these pigments appear in the table of FIG. 5, and were obtained by the procedure outlined above. Many of these pigments produce colors that change in both saturation and hue as thickness increases. Quinacridone Rose (Plate 5J) provides a good example of this effect. Plate 4A shows the range of colors of Quinacridone Rose over white, drawn as a curve in an RGB color cube. From a perspective looking down the luminance axis, it is clear that both hue and saturation vary along the curve. This characteristic is one of the qualities that gives these pigments their rich appearance.

Plates 1A and 1B demonstrate the effects of compositing a thick layer of Cerulean Blue over Quinacridone Rose, and vice versa. Note that in Plate 1A, the blue stroke almost completely hides the red. The thickness of the layers has been exaggerated to emphasize the difference between an opaque pigment and a transparent one.

Some colors have different hue characteristics when composited over black versus over white. Plate 4B shows the curves described by Hansa Yellow (Plate 5H) over black and over white. Note that the dark curve's hue leans toward the green side of yellow (G>R) before arcing back toward the orange, whereas the light curve stays entirely on the orange side (R>G).

Plates 4C–4F show the difference between the KM model and traditional alpha compositing. Plate 4C shows a gradation of Quinacridone Rose composited over Sap Green, with thickness varying from left to right and bottom to top, respectively.

Plate 4E was generated by alpha compositing a rose color and a green color taken directly from Plate 4C, using alpha mattes with similar gradations. The individual colors are much less saturated, and there is no variation in hue. Furthermore, when they are composited together, the result is much lighter, and the rose color seems to be more translucent than transparent.

Plates 4D and 4F show a similar comparison, this time using Hansa Yellow over Cobalt Blue. Note here that the image generated using the KM model (Plate 4D) is distinctly green in the overlapping area, a color which the alpha-blending model (Plate 4F) fails to match.

Discussion of KM Model

The KM model appears to give very plausible and intuitive results in all cases tried in connection with. the present invention. On the one hand, these results may not at first appear very surprising, considering that the KM model was specifically designed for situations akin to watercolor in which there are multiple pigmented layers that scatter and absorb light. It is, however, worth noting that there are a number of fine points in the basic KM assumptions that are satisfied, at best, only partially in a watercolor simulation, as follows:

1. The KM equations apply strictly to colorant layers immersed in a medium of the same refractive index. This assumption is in fact violated at both the "air to pigment layer" and "pigment layer to paper" boundaries (although it is contemplated that a fairly simple correction term could be used to increase the accuracy).

2. In the conventional application of the KM model, it is assumed that S and K are constant throughout each layer. However, this assumption is violated in the present invention by allowing mixtures of pigments within each layer.

3. In the conventional application of the KM model, it is assumed that a random orientation of particles produces diffuse reflection in the layer. While this assumption is satisfied for most watercolor paints, it is not true for all. For example, metallic paint pigments have mostly horizontal flakes.

4. A diffuse illumination is conventionally assumed when applying the KM model. In regard to the present invention, it is noted that simulated watercolors will not look entirely correct under all lighting and viewing conditions. Use of four parameters in the model instead of two can account for more general lighting conditions.

5. It is also conventionally assumed that the KM model only applies to one wavelength at a time. Fluorescent paints violate this assumption in the application of the KM model to the present invention.

6. The conventional application of the KM model assumes no chemical or electrical interaction occurs between different pigments, or between a pigment and a medium. It is also generally assumed in the conventional application of the model that no clumping of pigment grains occurs, and that the pigments have a uniform particle size. All of these assumptions are violated for most watercolor pigments in the present invention.

In summary, it is surprising that the KM model appears to work so well in the present invention, given the number of basic assumptions of the model that are violated by its application to a simulated watercolor. Given the conventional understanding of its limitation, one would thus not have been led to apply the KM model to simulated watercolor. Although applying the KM model in the present invention may not yield results that are physically accurate, these results at least provide very plausible physical approximations, which appear quite adequate for many applications.

Interactive Painting with Watercolors

A computer program user interface for the present invention has been written that allows a user to "paint the initial conditions" for a watercolor simulation. The user sets up one or more layers for the simulation, where each layer has sub-layers for pigments, water, and a wet-area mask. Common to all layers are a reference image (a handy crutch for the artistically challenged) and a shaded paper texture. In the current preferred embodiment, there are slider controls to adjust the layer parameters for damping, darkening, edge kernel effects, scale, and for setting the number of iterations. For each pigment, the weight and deposit may also be controlled by the user.

The layer's pigment channels are represented by colored images in the layer. Each pigment is painted independently using a circular brush with a Gaussian intensity drop-off. The brush size, penumbra, and overall intensity parameters are adjustable. A palette of pigments associated with a layer may be defined by specifying the color of each pigment over black and over white, as described in the previous section, using a hue-saturation-value color picker, or by loading predefined pigments from files.

Although a prototype watercolor simulator runs too slowly for interactive painting, compositing many layers of pigments using the KM model is feasible in real-time, and provides the user with valuable feedback about the colors that will result from the simulation. The reference image, paper texture, and set of layers and their sub-layers can be independently toggled on and off, and displayed to the user in any combination. Another helpful feature is a rendering window that displays the progress of running the simulation on a (possibly scaled down) set of layers. Lower resolution simulations are enlarged for display in the viewing window, and each frame of the simulator's animation is typically displayed in from a fraction of a second to a few minutes.

Automatic Image "Watercolorization"

Another application of the watercolor simulation process allows a color image that is input to the process to be automatically converted into a watercolorlike illustration, once mattes for the key elements have been extracted and an ordered set of pigments has been chosen, with one pigment per translucent layer. In tests of this application of the present invention, the mattes were quickly generated using a commercial paint program, and the set of pigments were selected by hand.

The computer system performs the watercolorization of an input color image in two steps. It first computes color separations for the specified pigments (as shown in Plate 7), and then applies a kind of "automatic brushstroking" to give the separations a hand-drawn appearance (as illustrated in Plate 8).

The color separations are calculated using a brute-force search over a discrete set of thicknesses for each pigment. In the preferred method, the thickness range for each pigment is first divided into 20 steps, using a binary subdivision by a Manhattan distance in the six-dimensional space of the $R_i$ and $T_i$ KM model parameters. Using the KM model, a composite color is then computed for each of the $20^3$ combinations, and the color is stored in a kd-tree (with k=3) according to its RGB color values. (The tree is pruned so that the difference between colors is less than 1/255.) Color separations are computed by searching the tree for each pixel to find the pigment combination yielding the closest color to the desired color. These colors are stored in an image called the target glaze.

Several color separations are shown in Plate 7. The first column shows the color separations (Plates 7D, G, J) used for the pear in Plate 8. Plate 7A is the result of compositing the three layers together. The second column (Plates 7B, E, H, K) shows the same process done using Cerulean Blue instead of Sap Green for the top layer. Note that the concentrations required in the bottom change as a result of this. The third column (Plates 7C, F, I, L) shows that using the same three pigments in a different order requires different concentrations as well.

The automatic brushstroking process uses simple heuristics to create a glaze that approximates, but does not exactly match, the glaze target. The process is designed to take advantage of the flow of water as a way of creating gradients and interesting textures within a wet region. For each matted region of the target glaze, the following process is repeated a small number of times (two to four times in the preferred embodiment used to create the examples shown in the Plates):

1. Compare the pigment distribution of the current glaze to the target glaze, ignoring high frequency details (i.e., subtract one from the other, and apply a low-pass filter to the difference).

2. In areas where the current glaze is too light (by more than $\delta_p$), add $\delta_p$ units of pigment to the glaze, accompanied by water.

3. In areas where the current glaze is too dark (by more than $\delta_w$), add 1 unit of water.

4. Run the simulator for a small number of time steps (three to ten time steps in the preferred embodiment used to create the examples).

5. Multiply $\delta_p$ by a refinement factor (0.5–1.0 in the preferred embodiment used to produce the examples) and repeat from Step 1.

As a final step, highlights are created by removing paint from areas defined by the user in the form of mattes. This is analogous to the "lifting out" technique used by artists for simiilar effects. The final results are shown in Plate 8.

Non-Photorealistic Rendering of 3D Models

A straightforward extension of the automatic watercolorization process discussed in the previous section is to perform non-photorealistic watercolor rendering directly from 3D models. Given a 3D geometric model, mattes for each object and their specular highlights can be automatically generated. These automatically created mattes could be used as input to the watercolorization process, along with a more traditional "photorealistic" rendering of the scene. Optimal pigments could be input by hand, or computed through an optimization process.

Results

All images except for Plates 2 and 9 were generated by the present invention. The figures for Plates 1 and 3 were rendered at 300 by 300 pixels, running for about 100–200 simulator iterations each (except for Plate 3D, which required 700 iterations). Each iteration required about two minutes to compute on a 150 MHz, R4400 processor, with the exception of Plate 3E, which took about ten minutes, and Plate 3D, which took about 20 minutes. The table in FIG. 4 lists the parameter definitions for the images in Plates 1 (i.e., 1A and 1B), and 3A–3F. In this table, parameters at non-default values are shown in bold font. Most of the non-default setting are in the pigment-specific parameters, except when trying to obtain more unusual effects, such as the backruns of Plate 3D. The backrun parameters are only set for Plate 3D; in all of the other plates referenced in this table, the backrun parameter is not used. Plate 3D has two columns of parameters, the first (indicated by *) applying to the initial stroke, and the second (indicated by **) applying to the second application that produced the backrun. In regard to Plates 1 (1A and 1B), a column is provided for each stroke, which are applied in separate glazes, i.e., as separate paint applications, after drying. The column marked with * for Plate 1 (1A and 1B) is for the horizontal stroke, and the column marked with ** is for the vertical stroke. In Plate 1A, the horizontal stroke was painted first, and in Plate 1B, the vertical stroke was painted first.

Plate 8 consists of eight major layers (three each for the apple and pear, and two for the background) at a resolution of 640 by 480 pixels. About 2250 time steps of the simulator were required to produce all of the layers. The final image took about two hours to compute on the same processor noted above. (The glazes for the stem of the pear and the dimple of the apple took up a negligible fraction of that time due to the relatively small area of these portions of the subjects.)

Computer System Suitable for Implementing the Present Invention

Figure 13:
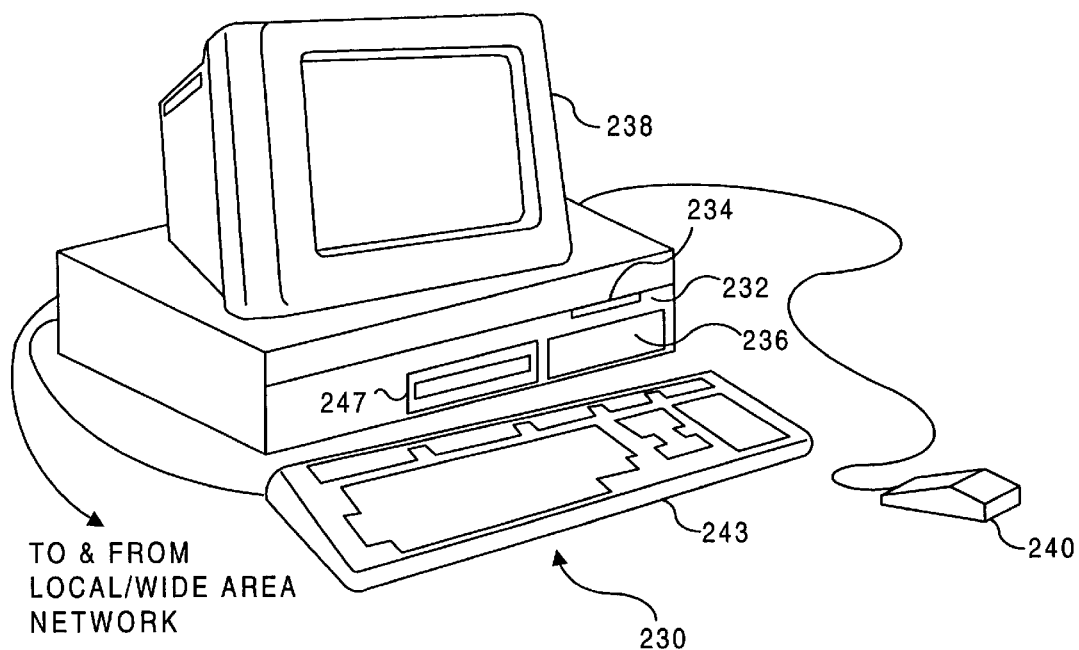
FIG. 13 is an isometric diagram illustrating a generally conventional personal computer suitable for use in implementing the present invention.

With reference to FIG. 13, a generally conventional personal computer 230 is illustrated, which is suitable for use in connection with practicing the present invention. Alternatively, a workstation coupled to a network and server may instead be used. Personal computer 230 includes a processor chassis 232 in which are mounted a floppy disk drive 234, a hard drive 236, a motherboard populated with appropriate integrated circuits (not shown), and a power supply (also not shown), as are generally well known to those of ordinary skill in the art. A monitor 238 is included for displaying graphics and text generated by software programs that are run by the personal computer. A mouse 240 (or other pointing device) is connected to a serial port (or to a bus port) on the rear of processor chassis 232, and signals from mouse 240 are conveyed to the motherboard to control a cursor on the display and to select text, menu options, and graphic components displayed on monitor 238 by software programs executing on the personal computer. In addition, a keyboard 243 is coupled to the motherboard for user entry of text and commands that affect the running of software programs executing on the personal computer.

Personal computer 230 also optionally includes a compact disk-read only memory (CD-ROM) drive 247 into which a CD-ROM disk may be inserted so that executable files and data on the disk can be read for transfer into the memory and/or into storage on hard drive 236 of personal computer 230. Personal computer 230 may be coupled to a local area and/or wide area network as one of a plurality of such computers on the network.

Figure 14:
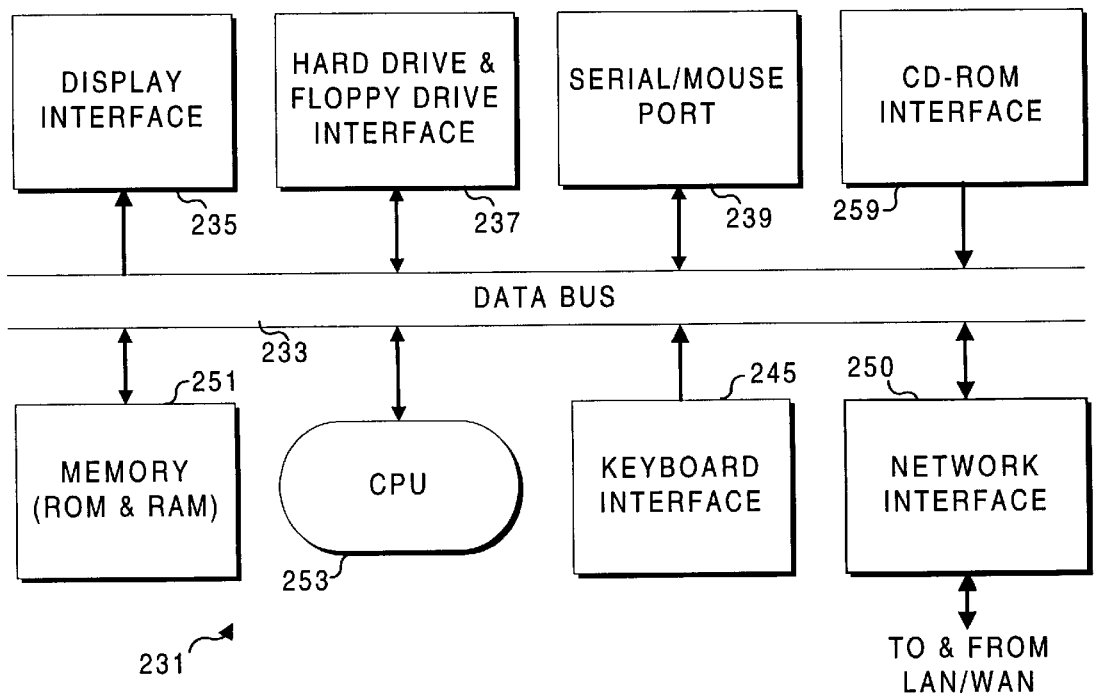
FIG. 14 is a block diagram illustrating some of the functional components included within the processor chassis of the personal computer illustrated in FIG. 13.

Although details relating to all of the components mounted on the motherboard or otherwise installed inside processor chassis 232 are not illustrated, FIG. 14 is a block diagram showing some of the functional components that are included. The motherboard has a data bus 233 to which these functional components are electrically connected. A display interface 235, comprising a video card, for example, generates signals in response to instructions executed by a central processing unit (CPU) 253 that are transmitted to monitor 238 so that graphics and text are displayed on the monitor. A hard drive and floppy drive interface 237 is coupled to data bus 233 to enable bidirectional flow of data and instructions between data bus 233 and floppy drive 234 or hard drive 236. Software programs executed by CPU 253 are typically stored on either hard drive 236, or on a floppy disk (not shown) that is inserted into floppy drive 234. The software instructions for implementing the present invention will likely be distributed either on floppy disks, or on a CD-ROM disk or some other portable memory storage medium. The machine instructions comprising the software application that implements the present invention will also be loaded into the memory personal computer for execution by CPU 253.

A serial/mouse port 239 (representative of the two serial ports typically provided) is also bidirectionally coupled to data bus 233, enabling signals developed by mouse 240 to be conveyed through the data bus to CPU 253. It is also contemplated that a universal serial bus (USB) port may be included and used for coupling a mouse and other peripheral devices to the data bus. A CD-ROM interface 259 connects CD-ROM drive 247 to data bus 233. The CD-ROM interface may be a small computer systems interface (SCSI) type interface or other interface appropriate for connection to and operation of CD-ROM drive 247.

A keyboard interface 245 receives signals from keyboard 243, coupling the signals to data bus 233 for transmission to CPU 253. Optionally coupled to data bus 233 is a network interface 250 (which may comprise, for example, an ETHERNET™ card for coupling the personal computer or workstation to a local area and/or wide area network).

When a software program is executed by CPU 253, the machine instructions comprising the program that are stored on a floppy disk, a CD-ROM, a server (not shown), or on hard drive 236 are transferred into a memory 251 via data bus 233. These machine instructions are executed by CPU 253, causing it to implement functions determined by the machine instructions. Memory 251 includes both a nonvolatile read only memory (ROM) in which machine instructions used for booting up personal computer 230 are stored, and a random access memory (RAM) in which machine instructions and data are temporarily stored when executing application programs.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

What is claimed is:

1. A method for producing a watercolor simulation that represents at least one wash applied to paper, each wash including at least one pigment dispersed in a fluid, comprising the steps of:

(a) providing a fluid model that includes a plurality of layers for each wash included in the watercolor simulation, wherein said plurality of layers comprise:
   (i) a shallow fluid layer in which the wash flows above a surface of the paper;
   (ii) a pigment deposition layer where a pigment is adsorbed and desorbed by the paper; and
   (iii) a capillary layer within the paper in which the wash is diffused by a capillary action;

(b) as a function of a plurality of predefined parameters and in accord with the fluid model, specifying how each wash flows over the paper to determine quantities of each pigment (c) applying an optical composite model to render the watercolor simulation as a function of optical characteristics of each pigment and as a function of the quantities of each pigment deposited at the plurality of discrete spatial locations on the paper.

2. The method of claim 1, wherein the plurality of parameters include at least one of:
   (a) physical properties of each pigment employed in producing the watercolor simulation;
   (b) physical properties of the paper used for the watercolor simulation; and
   (c) predetermined values used in defining the fluid model.

3. The method of claim 1, wherein the quantities of each pigment deposited at the plurality of discrete spatial locations are stored in an array, and wherein a data structure that includes the arrays for the pigments used in a wash comprises a glaze.

4. The method of claim 1, wherein a Kubelka-Munk model is employed as the optical composite model for rendering the watercolor simulation.

5. The method of claim 1, wherein the step of specifying how each wash flows over the paper includes the step of determining a movement of the wash in the shallow fluid layer, as a function of a velocity of the wash as it moves over the paper.

6. The method of claim 5, wherein the step of specifying how each wash flows over the paper further includes the step of reducing a divergence of a velocity field for each wash by redistributing the wash, so that the divergence in a specific time interval is less than a predetermined value.

7. The method of claim 5, wherein the step of specifying how each wash flows over the paper further includes the step of reducing the quantity of pigment at the discrete spatial locations as a function of the velocity of the wash away from the discrete spatial locations.

8. The method of claim 1, further comprising the step of determining a rate of absorption and desorption for the pigment in each wash as a function of the predefined parameters, said rate being used to determine the quantities of each pigment deposited at the discrete spatial locations.

9. The method of claim 1, further comprising the step of providing an edge darkening effect as a function of the predefined parameters, by increasing the quantities of each pigment at discrete spatial locations corresponding to edges of areas in the watercolor simulation covered by a wash.

10. The method of claim 1, further comprising the step of determining a diffusion of a wash through the capillary layer, thereby increasing a wet-area in the watercolor simulation, to simulate a backrun effect.

11. The method of claim 1, further comprising the step of providing a user interface that enables a user to selectively adjust at least a subset of the predefined parameters.

12. The method of claim 11, wherein the user interface enables the user to select pigments that will be used in the watercolor simulation.

13. The method of claim 11, wherein the user interface enables the user to specify a color of a pigment as said pigment appears when applied over a specific background color.

14. The method of claim 13, wherein the user specifies the color components of the pigment as a functions of its appearance as applied over both a black background and a white background, said color components being then used to determine a set of absorption coefficients and scattering coefficients for each pigment.

15. The method of claim 1, further comprising the steps of enabling a user to select at least a subset of the predefined parameters that will be applied to each layer; and, providing a wet-area mask for at least one layer.

16. The method of claim 1, wherein the paper specified has a texture that includes alternating high and low regions, further comprising the step of simulating a dry brush effect in which said at least one pigment is deposited on the high regions of the paper, but not on the low regions, to simulate a dry brush application of said at least one pigment to the texture of the paper.

17. The method of claim 1, further comprising the step of repeating steps (a)–(c) to produce a plurality of frames of successive watercolor simulations in which at least one depicted object changes position; and concatenating the plurality of frames, so that when the plurality of frames are displayed sufficiently rapidly, they form an animation in which said object appears to move.

18. The method of claim 1, wherein the watercolor simulation is based on a color image that is not a watercolor.

19. The method of claim 18, further comprising the steps of:
   (a) providing a color image for conversion to the watercolor simulation;
   (b) extracting mattes for specific portions of the color image;
   (c) selecting an ordered set of pigments to be applied to the mattes;
   (d) determining color separations for the ordered set of pigments; and
   (e) applying an automatic brushstroking when rendering the color separations.

20. The method of claim 19, wherein the step of determining the color separations comprises the steps of:
   (a) dividing a thickness range for each of the ordered set of pigment into a plurality of steps, using a binary subdivision in the optical composite model;
   (b) using the optical composite model, determining a composite color for combination of the plurality of steps;
   (c) storing the composite colors in a color tree according to their color values; and
   (d) determining the color separations by searching the color tree for each pixel to find a pigment combination for each discrete spatial location that yields a color closest to a desired color in the colored image.

21. The method of claim 18, wherein the color image comprises a three-dimensional geometric model.

22. A system for producing a watercolor simulation that represents at least one wash applied to paper, each wash including at least one pigment dispersed in fluid, comprising:
   (a) a memory in which a plurality of machine instructions are stored, said machine instructions defining a plurality of functions;
   (b) a device upon which images are rendered for viewing by a user; and
   (c) a processor coupled to the memory and to the device upon which images are rendered, said processor executing the machine instructions to implement the plurality of functions, including:
      (i) providing a fluid model that includes a plurality of layers for each wash included in the watercolor simulation, wherein said plurality of layers comprise a shallow fluid layer in which the wash flows above a surface of the paper, a pigment deposition lauer where a pigment is adsorbed and desorbed by the paper, and a capillary layer within the paper in which the wash is diffused by a capillary action;
      (ii) as a function of a plurality of predefined parameters and in accord with the fluid model, specifying how each wash flows over the paper to determine quantities of each pigment deposited at a plurality of discrete spatial locations on the paper; and (iii) applying an optical composite model to render the watercolor simulation on the device as a function of optical characteristics of each pigment and as a function of the quantities of each pigment deposited at the plurality of discrete spatial locations on the paper.

23. A method for producing a watercolor simulation that represents at least one wash applied to paper, each wash including at least one pigment dispersed in a fluid, comprising the steps of:

(a) providing a fluid model that includes a plurality of layers for each wash included in the watercolor simulation;

(b) as a function of a plurality of predefined parameters and in accord with the fluid model, specifying how each wash flows over the paper to determine quantities of each pigment deposited at a plurality of discrete spatial locations on the paper, such that
   (i) said quantities of each pigment are stored as a set of floating-point image arrays, with one array for each pigment in the wash; and
   (ii) a data structure that includes said floating-point image arrays defines a glaze; and (c) applying an optical composite model to render the watercolor simulation as a function of optical characteristics of each pigment and as a function of the quantities of each pigment deposited at the plurality of discrete spatial locations on the paper.

24. A method for producing a watercolor simulation that represents at least one wash applied to paper, each wash including at least one pigment dispersed in a fluid, comprising the steps of:

(a) providing a fluid model that includes a plurality of layers for each wash included in the watercolor simulation; said fluid model incorporating a shallow water fluid layer in which water and a pigment comprising a wash flow over the paper with a velocity that determines the deposition of the pigment on the paper in a pigment deposition layer;

(b) as a function of a plurality of predefined parameters and in accord with the fluid model, specifying how each wash flows over the paper to determined quantities of each pigment deposited at a plurality of discrete spatial locations on the paper; and (c) applying an optical composite model to render the watercolor simulation as a function of optical characteristics of each pigment and as a function of the quantities of each pigment deposited at the plurality of discrete spatial locations on the paper.

* * * * *

UNITED STATES PATENT AND TRADEMARK OFFICE
CERTIFICATE OF CORRECTION

PATENT NO.   : 6,198,489 B1
DATED        : March 6, 2001
INVENTOR(S)  : Salesin et al.

It is certified that error appears in the above-identified patent and that said Letters Patent is hereby corrected as shown below:

Title page,
Item [56], 3rd reference, OTHER PUBLICATIONS,
"Towards" should read -- Toward --

Column 1,
Line 8, before the section "FIELD OF THE INVENTION" please insert the following section:

-- GOVERNMENT RIGHTS

This invention was made with government support under N00014-96-1-0915 and N00014-95-1-0728 awarded by the U.S. Department of the Navy. The Government has certain rights to the invention. --

Column 2,
Line 3, "simulationi" should read -- simulation --
Line 17, "parameter-s" should read -- parameters --

Column 3,
Line 1, "arc" should read -- are --

Column 4,
Line 67, "arc" should read -- are --

Column 5,
Line 44, "form's" should read -- forms --

Column 8,
Line 38, "v,p," should read -- v, p, --
Line 41, "Reduce Divergetice" should read -- Reduce Divergence --

UNITED STATES PATENT AND TRADEMARK OFFICE
CERTIFICATE OF CORRECTION

PATENT NO. : 6,198,489 B1
DATED : March 6, 2001
INVENTOR(S) : Salesin et al.

It is certified that error appears in the above-identified patent and that said Letters Patent is hereby corrected as shown below:

Column 9,
Line 23, "decreinented" should read -- decremented -- ; and "$u_{i+1/2)\ j}$" should read -- $u_{i+1/2,j}$ --

Column 10,
Line 19, "$(\partial u/\partial v + \partial v/\partial y)$" should read -- $(\frac{\partial u}{\partial v} + \frac{\partial v}{\partial y})$ --

Line 45, "(count<1 maxsteps))" should read --(count<maxsteps)) --

Line 52, "$v_{i+1/2,j}-v_{it-1/2,j})$" should read -- $v_{i,j+1/2}-v_{i,j-1/2})$ --

Column 11,
Line 9, "vcomputed" should read -- v computed --

Line 38, "$\hat{g}\hat{s}$" should read -- $\hat{gs}$ --

Line 39, "$\hat{g}\hat{s}$" should read -- $\hat{gs}$ --

Line 40, "$\hat{g}\hat{s}$" should read -- $\hat{gs}$ --

Line 41, "$\hat{g}\hat{s}$" should read -- $\hat{gs}$ --

Line 42, "$\hat{g}\hat{s}$" should read -- $\hat{gs}$ --

Line 54, "gs = $\hat{g}\hat{s}$" should read -- $gs$ = $\hat{gs}$ --

Column 13,
Line 51, "a" should read -- σ --

Column 14,
Line 20, after equation (3) please insert equation (4):

-- K-S(a-1)    (4)

where --

UNITED STATES PATENT AND TRADEMARK OFFICE
CERTIFICATE OF CORRECTION

PATENT NO. : 6,198,489 B1
DATED : March 6, 2001
INVENTOR(S) : Salesin et al.

It is certified that error appears in the above-identified patent and that said Letters Patent is hereby corrected as shown below:

Column 15,
Line 10, "R=sin hbSd/c" should read -- Rsinh bSd/c --
Line 15, "c=asin hbSD+b cos hbSD" should read
-- $c = a \sinh bSD + b \cosh bSD$ --
Column 16,
Line 14, "with." should read -- with --

Column 18,
Line 36, "simiilar" should read -- similar --

Signed and Sealed this

Twelfth Day of February, 2002

Attest:

Attesting Officer

JAMES E. ROGAN
Director of the United States Patent and Trademark Office